US011568335B2

(12) United States Patent
Pinard

(10) Patent No.: US 11,568,335 B2
(45) Date of Patent: Jan. 31, 2023

(54) COMMUNICATION SYSTEM FACILITATING A CONTEXTUAL ENVIRONMENT FOR A USER FILLING VARIOUS ROLE AGENTS

(71) Applicant: Deborah Pinard, Kanata (CA)

(72) Inventor: Deborah Pinard, Kanata (CA)

(73) Assignee: Initlive Inc., Ottawa (CA)

( * ) Notice: Subject to any disclaimer, the term of this patent is extended or adjusted under 35 U.S.C. 154(b) by 0 days.

(21) Appl. No.: 15/375,708

(22) Filed: Dec. 12, 2016

(65) Prior Publication Data

US 2017/0091682 A1 Mar. 30, 2017

Related U.S. Application Data

(62) Division of application No. 13/644,966, filed on Oct. 4, 2012, now Pat. No. 9,552,558.

(60) Provisional application No. 61/558,225, filed on Nov. 10, 2011, provisional application No. 61/546,593, filed on Oct. 13, 2011, provisional application No. 61/545,610, filed on Oct. 11, 2011.

(51) Int. Cl.
*G06Q 10/10* (2012.01)
*G06Q 10/06* (2012.01)
*G06Q 50/00* (2012.01)

(52) U.S. Cl.
CPC ....... *G06Q 10/06311* (2013.01); *G06Q 10/06* (2013.01); *G06Q 10/10* (2013.01); *G06Q 50/01* (2013.01)

(58) Field of Classification Search
CPC .................. G06Q 10/06311; G06Q 50/01
See application file for complete search history.

(56) References Cited

U.S. PATENT DOCUMENTS

| 6,539,404 | B1 | 3/2003 | Ouchi |
| 6,675,194 | B1* | 1/2004 | Pinard ............... H04Q 3/54525 370/352 |
| 8,082,308 | B1 | 12/2011 | Filev |
| 2002/0144013 | A1* | 10/2002 | Pinard .................. H04Q 3/627 719/317 |
| 2003/0097434 | A1* | 5/2003 | Parry .................... G06F 3/1204 709/222 |
| 2003/0107591 | A1 | 6/2003 | Jameson |
| 2005/0246319 | A1 | 11/2005 | Kuelzow |
| 2006/0004605 | A1* | 1/2006 | Donoghue ............. G06Q 10/10 705/2 |

(Continued)

FOREIGN PATENT DOCUMENTS

WO 2012071474 A1 5/2012

*Primary Examiner* — Kyle R Stork
(74) *Attorney, Agent, or Firm* — Rosenberg, Klein & Lee

(57) ABSTRACT

A system is provided for implementing, managing or running a communication or workflow management system having multiple role agents representing roles, person agents representing users and device agents representing devices. The system combines a plurality of the role agents and their associated person agents and device agents into at least one mission, links the role agents to the person agents with a policy chain, and links the person agents to the device agents with a policy chain within a mission. Selected communications may be linked to at least one of the missions with a policy chain, such as a policy chain that links selected communications to at least one of the role agents in a mission.

21 Claims, 21 Drawing Sheets

(56) References Cited

U.S. PATENT DOCUMENTS

| | | | |
|---|---|---|---|
| 2006/0031849 A1* | 2/2006 | Barta | G06F 9/4843 |
| | | | 719/320 |
| 2006/0044307 A1* | 3/2006 | Song | G06Q 10/06 |
| | | | 345/419 |
| 2006/0068862 A1* | 3/2006 | Zheleznyakov | G06Q 30/02 |
| | | | 463/9 |
| 2006/0101266 A1* | 5/2006 | Klassen | G06Q 20/347 |
| | | | 713/170 |
| 2006/0168259 A1* | 7/2006 | Spilotro | H04L 63/102 |
| | | | 709/229 |
| 2008/0077593 A1 | 3/2008 | Abrams | |
| 2008/0148154 A1 | 6/2008 | Burrell | |
| 2008/0158256 A1* | 7/2008 | Russell | G06T 7/32 |
| | | | 345/629 |
| 2008/0209417 A1* | 8/2008 | Jakobson | G06F 9/4856 |
| | | | 718/100 |
| 2008/0256192 A1* | 10/2008 | Pinard | G06Q 30/02 |
| | | | 709/206 |
| 2008/0270240 A1* | 10/2008 | Chu | G06Q 30/0239 |
| | | | 705/14.11 |
| 2008/0299951 A1 | 12/2008 | Karkanias | |
| 2009/0132665 A1 | 5/2009 | Thomsen | |
| 2009/0260051 A1 | 10/2009 | Igakura | |
| 2010/0037222 A1* | 2/2010 | Tatsubori | G06F 9/485 |
| | | | 718/100 |
| 2010/0325584 A1 | 12/2010 | Mckenzie | |
| 2011/0239132 A1 | 9/2011 | Jorasch | |
| 2011/0271220 A1* | 11/2011 | Remsberg | G06Q 10/06 |
| | | | 715/772 |
| 2012/0059906 A1 | 3/2012 | Ciancio-Bunch | |
| 2013/0346134 A1 | 12/2013 | Klug | |

* cited by examiner

Work Area contains an Agent Screen 1701

Jane Doe - 247

Agent View

| Ext | Name | Agent State | Time in State |
|---|---|---|---|
| 154 | Melissa | Not Ready | 00:04:30 |
| 248 | Hon | Available | 00:04:30 |
| 227 | Jerry | Unstaffed | 17:23:34 |
| 247 | Jane Doe | Busy | 00:00:16 |

| WG | Login/Out | Last Login Time | Login Duration | Last Logout Time |
|---|---|---|---|---|
| 200 | IN | 06/02/2009:08:19:30 | 07:02:44 | |
| 450 | IN | 06/01/2009:07:59:57 | 1:07:22:17 | |

Work — Play

Patents 30 | Family 5
Market Research 5 | Photography 10
Help Desk 3 | Swimming 8

A New Role can appear which is Time-Based, for example a Call Center Agent Shift Start 1700

Figure 17

COMMUNICATION SYSTEM FACILITATING A CONTEXTUAL ENVIRONMENT FOR A USER FILLING VARIOUS ROLE AGENTS

CROSS-REFERENCE TO RELATED APPLICATION

This application claims the benefit as a divisional of U.S. patent application Ser. No. 13/644,966 filed Oct. 4, 2012 entitled "Communication System Facilitating a Contextual Environment for a User Filling Various Role Agents" which itself claims priority from U.S. Provisional Application No. 61/545,610, filed Oct. 11, 2011 entitled "System for Creating a Contextual Environment for a User Filling Various Roles", 61/546,593, filed Oct. 13, 2011 entitled "System for Creating a Contextual Environment for a User Filling Various Roles Associated with a Mission", and 61/558,225, filed Nov. 10, 2011 entitled "System for Creating a Contextual Environment for a User Filling Various Roles Associated with a Mission", all of which are hereby incorporated by reference herein in their entirety.

FIELD OF THE INVENTION

This invention relates generally to the field of voice and data communications, and in particular to a system for managing communications and other forms of data for a user able to fill various roles, for managing communications and other forms of data for a mission made up of people using devices and filling roles within a group.

BACKGROUND OF THE INVENTION

In today's world, where we can communicate using many different means, keeping track of all of communications, and having them all available at the same time is cumbersome. Add to that the fact that there are communication applications that apply to various different roles at both work and at home, and we use many different devices to communicate with, the problem becomes even more complex. Examples of communications applications are Facebook, Twitter, LinkedIn, Various forms of Email, YouTube, MSN Messenger, Yammer, Skype, Google Talk, and SMS.

Devices used to communicate can include for example smart phones, tablets, PC's, SIP phones, proprietary digital phones, cell phones, collaboration tools, and web pages Communications can include for example email, voice call, chat, SMS, tweet, document, work Item, video call, fax, voice or text page/broadcast, contact closure, contacts, RSS feeds, blogs, and an alarm New applications at work based on "Enterprise Social Networking" are becoming prevalent (e.g. Yammer, Salesforce Chatter, Socialtext, Microsoft SharePoint). Twitter-style updates and Facebook-like profile pages are at the core of nearly all these products.

We assume many roles within personal and business life. We subscribe to many applications using many different device types. We have to remember many different passwords to log in to some of these applications. New applications are being produced every day for a user's various different roles. In both business and personal life, there are recurring tasks that are done by one or more people that creates a repeatable mission. A mission encompasses roles, policies, people and devices. This embodiment describes a communication or workflow management system to implement, manage and run these missions that encompass roles, people and devices and the policies that join roles together and a user interface for a user to manage these various roles within the context of business and personal life.

SUMMARY

In accordance with one embodiment, a system is provided for implementing, managing or running a communication or workflow management system having multiple role agents representing roles, person agents representing users and device agents representing devices. The system combines a plurality of the role agents and their associated person agents and device agents into at least one mission, links the role agents to the person agents with a policy chain, and links the person agents to the device agents with a policy chain within a mission. Selected communications may be linked to at least one of the missions with a policy chain, such as a policy chain that links selected communications to at least one of the role agents in a mission.

In one implementation, the missions include work items which are treated as communications. The missions preferably include pre-defined role agents, person agents, device agents, policies, policy chains, and work items, instantiated with appropriate connections and filled in with data, and are adapted to receive incoming communications. The system creates a termination event that is either a user invoked termination event or stored termination criteria for a selected mission, and terminates the selected mission in response to the occurrence of the termination event. The mission may be for at least one social or business event selected from the group consisting of a party, a wedding, a meeting, and a conference. For example, the mission may implement, manage or run a game. A work item sent to a user through a device may contain a downloadable application that lets the user interface with the system through the application once downloaded. The application preferably gathers data and sends it to the system to be stored as data in at least one entity selected from the group consisting of policies, work items, role agents, person agents and device agents.

According to one particular embodiment, there is provided a system for creating a contextual environment for a user capable of filling various roles, comprising a module for generating a graphical user interface to present different screens or menus to a user based on the user's role; a module for displaying and managing roles associated with the user, where the roles are linked to the user by defined policies in accordance with criteria stored in a first memory; a module for displaying and managing multiple input and output devices associated with the user, where the input and output devices are linked to the user by defined policies in accordance with criteria stored in a second memory; a module for establishing connections to the input and output devices in accordance with the defined policies; a selection entity for accepting user input indicative of a particular role; and a module for selecting the appropriate screen for presentation to the user based on the user's current role, and wherein the active input and output devices apparent to the user are those associated with the current role as determined by the defined policies.

It will be understood in this context that input and output "devices" include any entity capable of interacting with a human user, and in particular a physical device such as smartphones and the like, but they can also be web pages, such as Facebook or LinkedIn pages, or a Twitter feed, for example as web pages that deliver applications like Facebook or LinkedIn is considered a device in much the same way as a smartphone or another physical communications device. The invention allows the user to manage multiple such devices in an orderly manner, recognizing that not all such devices will be relevant to any particular role.

The first and second memory can of course be part of the same larger memory, or can be separate memory elements.

The modules are typically implemented in software running on a suitable processor, although they can be implemented in hardware performing the same function.

A person's role can be both business and personal related. Embodiments of the present invention allow a person to set up and manage all these relationships and roles. This can be combined with standard devices like PCs, tablets and cell/smart phones. The application is an aggregator of "devices" based on role for a particular person.

In a preferred embodiment, the invention can be implemented as an application for running on a PC, tablet, smartphone or another suitable platform. Typically, at start-up, the application opens all the applications and devices associated with the user, identifies the current role, and presents the appropriate user screen. Thus, if the user is currently filling a personal role, the Facebook web page associated with the personal role may be made available on the screen, either as an icon or an open page, and incoming calls directed to the user's personal telephone number will be directed to the user's smartphone. An incoming message on a LinkedIn page, which might normally be associated with the person's business role, might give an indication via the business icon, but will not normally be available unless the user switched roles by clicking on the business icon. Likewise, a call directed to the user's business number will not be directed to the user's smartphone unless the user switched roles. A default policy might be to route it to a voicemail, or an alternative destination such as a secretary. The presence of the incoming call to the person's business role can however trigger an indication on the business icon, in which case the user might elect to switch roles. The incoming call might then be forwarded to the user's smartphone.

The user can also set up a policy to ensure, for example, that a call from a particular number automatically trigger a switch in roles. For example, a call from a family member might override other considerations and switch the context into family mode.

BRIEF DESCRIPTION OF THE DRAWINGS

The invention will now be described in more detail, by way of example only, with reference to the accompanying drawings, in which:

FIGS. 10 to 20 are sample user interfaces;

DETAILED DESCRIPTION OF ILLUSTRATED EMBODIMENTS

Although the invention will be described in connection with certain preferred embodiments, it will be understood that the invention is not limited to those particular embodiments. On the contrary, the invention is intended to cover all alternatives, modifications, and equivalent arrangements as may be included within the spirit and scope of the invention as defined by the appended claims.

Figure 1:
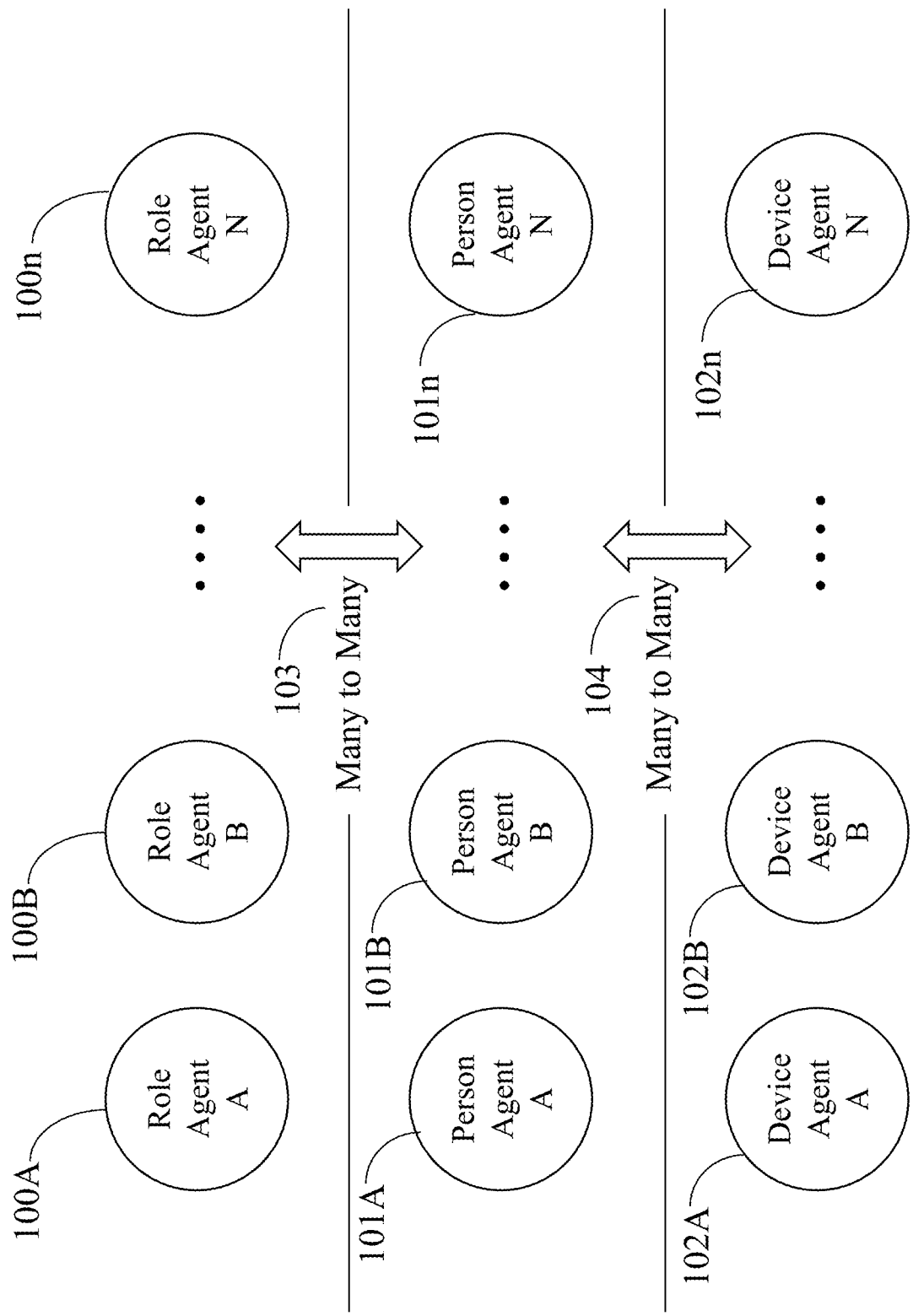
FIG. 1 shows an architecture with three levels.

FIG. 1 shows an architecture for implementing, managing and running a communication or workflow management system with three levels, role agents 100A, 100B, 100N, person agents 101A, 101B, 101N and device agents 102A, 102B, 102N, with a many to many relationships between each 103, 104. A person agent 101 and device agent 102 are software entities (agents) representing real world entities, while role agents 100 are software entities (agents) representing a real word concept. For example, in the case of a help desk, you can have a helper role (represented by a role agent 100) that is filled by different people (represented by different person agents 101) which use different devices (represented by device agents 102) to manage communications.

Figure 2:
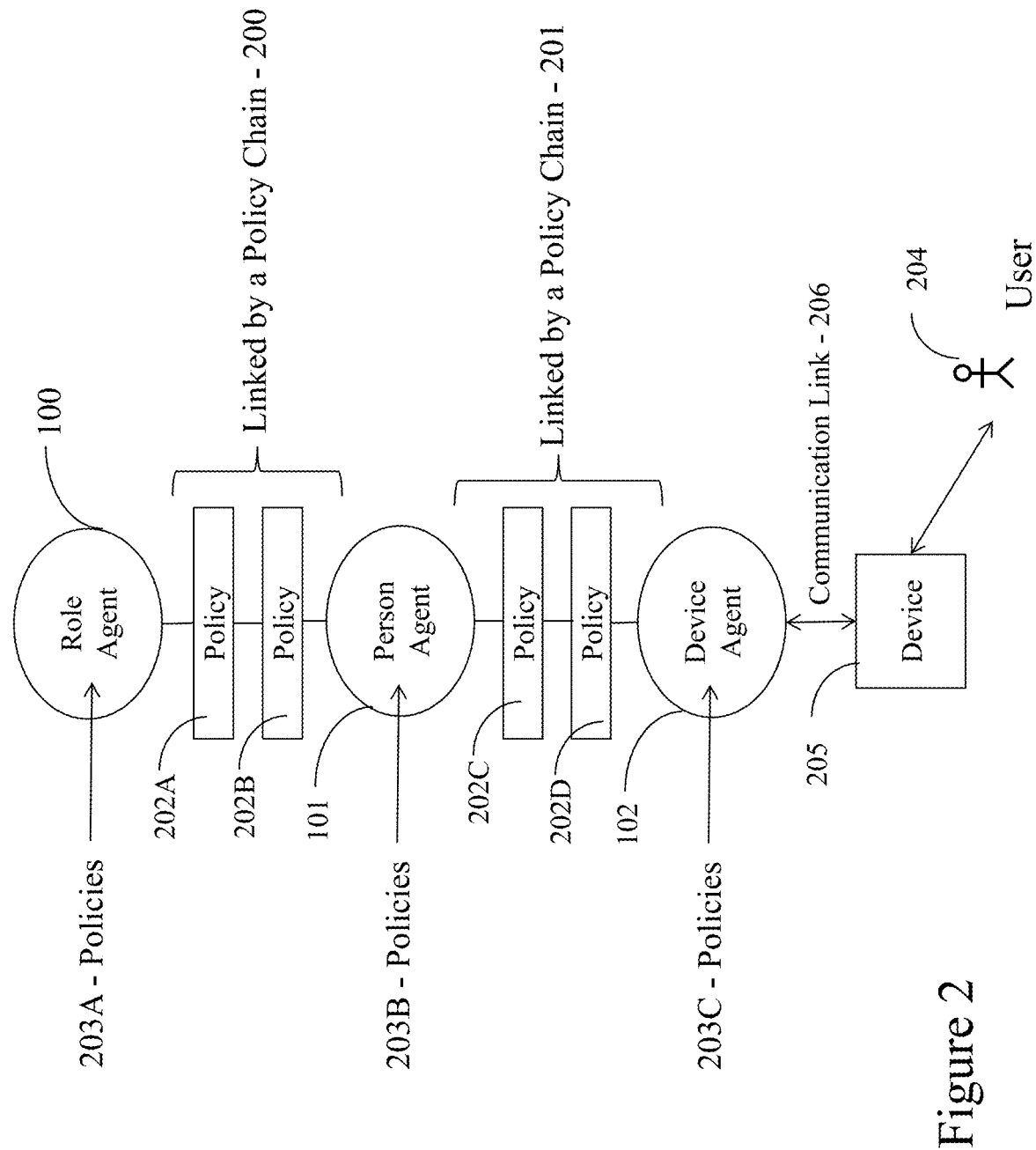
FIG. 2 illustrates the concept of policy chains.

Policy chains 200, 201 link the levels together with different policies 202A, 202B, 202C, 202D as shown in FIG. 2. Policy chains 200, 201 can have one or more policies 202. Policies 203A, 203B, 203C can also reside within the role agent 100, person agent 101 and device agent 102. The user 204 (represented by person agent 101) uses devices 205 (represented by device agent 102) to interact with the system. Device agents 102 use a communication link 206 to talk to devices 205. This link is for example, a protocol, or an API that the device agent 102 uses to communicate with the device 205. This means that the rest of the system does not need to know about specific device 205 communication languages. An example of a policy chain 200 using the help desk example is when you have a helper role agent linked to a day of week policy linked to a time of day policy linked to a group policy, which then picks a person agent to handle a communication. An example of a policy located within an agent is a screening policy, which can stop one user from communicating with another user. In this case a list of all black-listed people would reside in the person agent.

Figure 3:
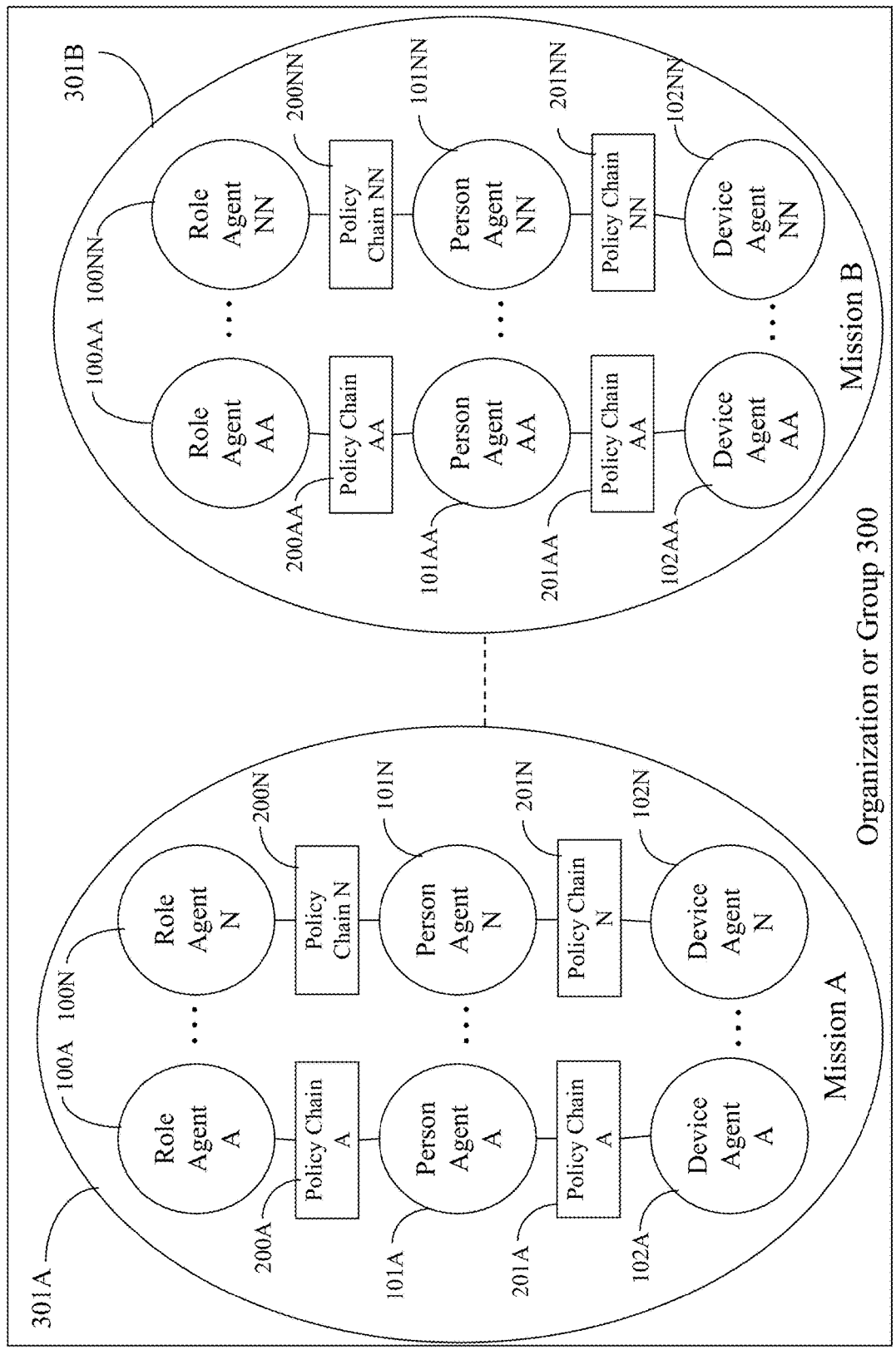
FIG. 3 shows an architecture with three levels further grouped into missions.

Referring to FIG. 3, an organization or group 300 which has role agents 100A, 100N, 100AA, 100NN, policy chains 200A, 200N, 200AA, 200NN between role agents 100 and person agents 101, person agents 101A, 101N, 101AA, 101NN and policy chains 201A, 201N, 201AA, 201NN between person agents 101, and device agents 102A, 102N, 102AA, 102NN, can further have created and defined missions 301A, 301B which group role agents 100 and their subsequent connections. Incoming communications 306 contain data 307 routed to the organization or group 300 are put in a communication queue 305 and can follow a policy chain 302 based on the data 307 and be routed to the correct mission 301A, 301B, or both. Data 307 in the incoming communications 306 could include for example:

To address
From address
From data
Time
Day
Subject
Title

Type of communication

Missions 301 can also add communications 304 to the communication queue 305, thus allowing communications to be routed between missions 301 or back into missions 301. Note that a person agent 101 could reside in one or more missions 301.

Figure 4:
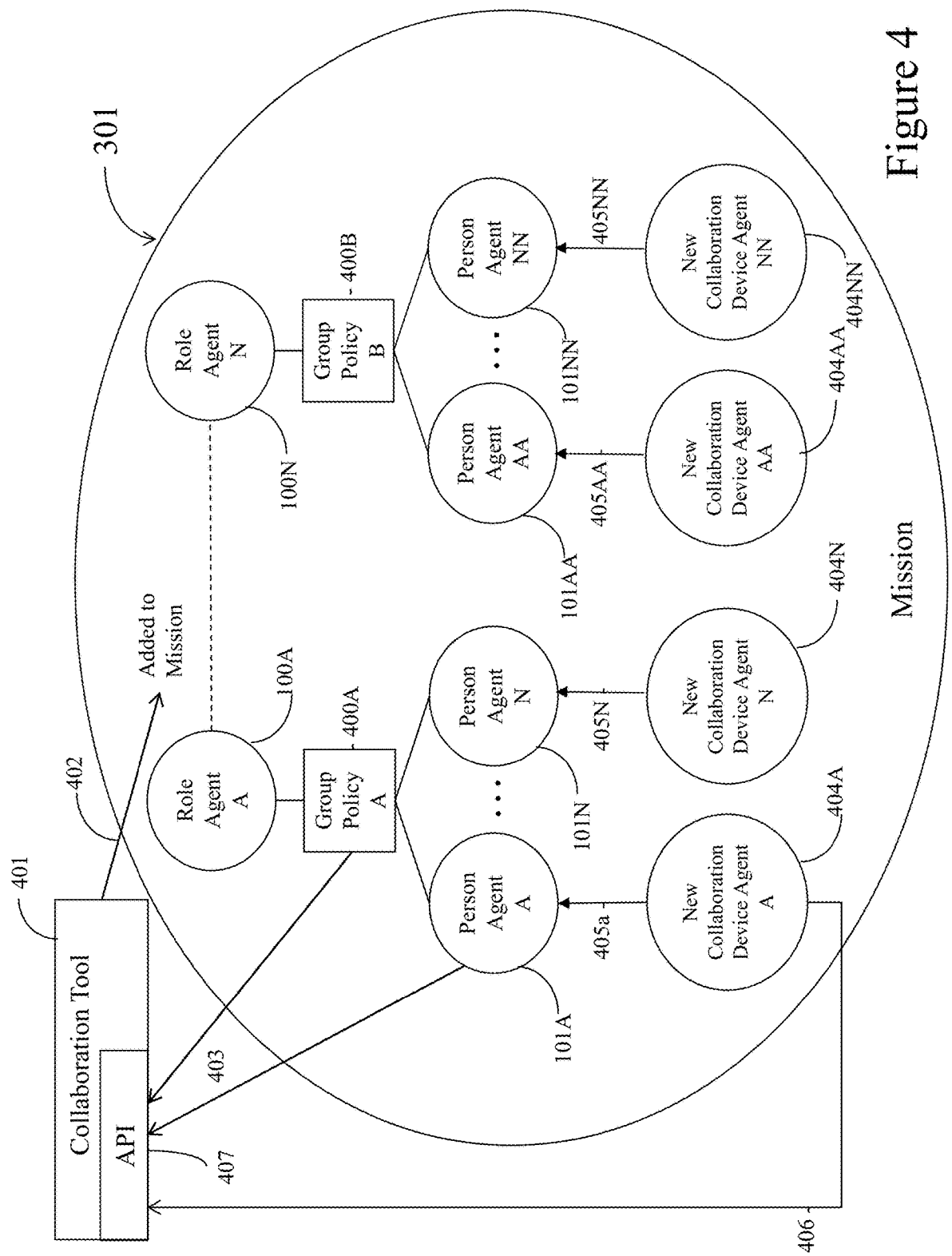
FIG. 4 shows a collaboration tool being added to the mission.

One or more collaboration tools can be associated to a mission 301. Referring to FIG. 4, a collaboration tool 401 can be added 402 to the mission 301, which will cause new collaboration device agents 404A, 404N, 404AA, 404NN, based on the collaboration tool 401 to be added 405A, 405N, 405AA, 405NN to the person agent 101A, 101N, 101AA, 101NN. This new collaboration device agent 404 will communicate 406 with the collaboration tool 401 through for example API 407. Policies can also be created and defined between the person agent 101 and the new collaboration device agent 404, for example to route specific communication types to the tool. In turn, the mission 301 can cause the person agents 101 and groups created and defined by group policy 400A, 400B that are created and defined in the mission 301 to automatically be created and defined 403 in the collaboration tool 401 through for example a published well-known API 407 provided by the collaboration tool 401. This can also include the creation of distribution lists based on the role agent/group (100/400), or changes to any other application within the collaboration tool 401 relevant to the mission 301. If the mission 301 is given context with keywords, then appropriate feeds, web sites, ads, etc. can also be added to the collaboration tool 401, or to any user interface a user 204 within the mission 301 uses.

Missions 301 can be created around existing role agents 100, or role agents 100 can be created within the context of a mission 301.

Figure 5:
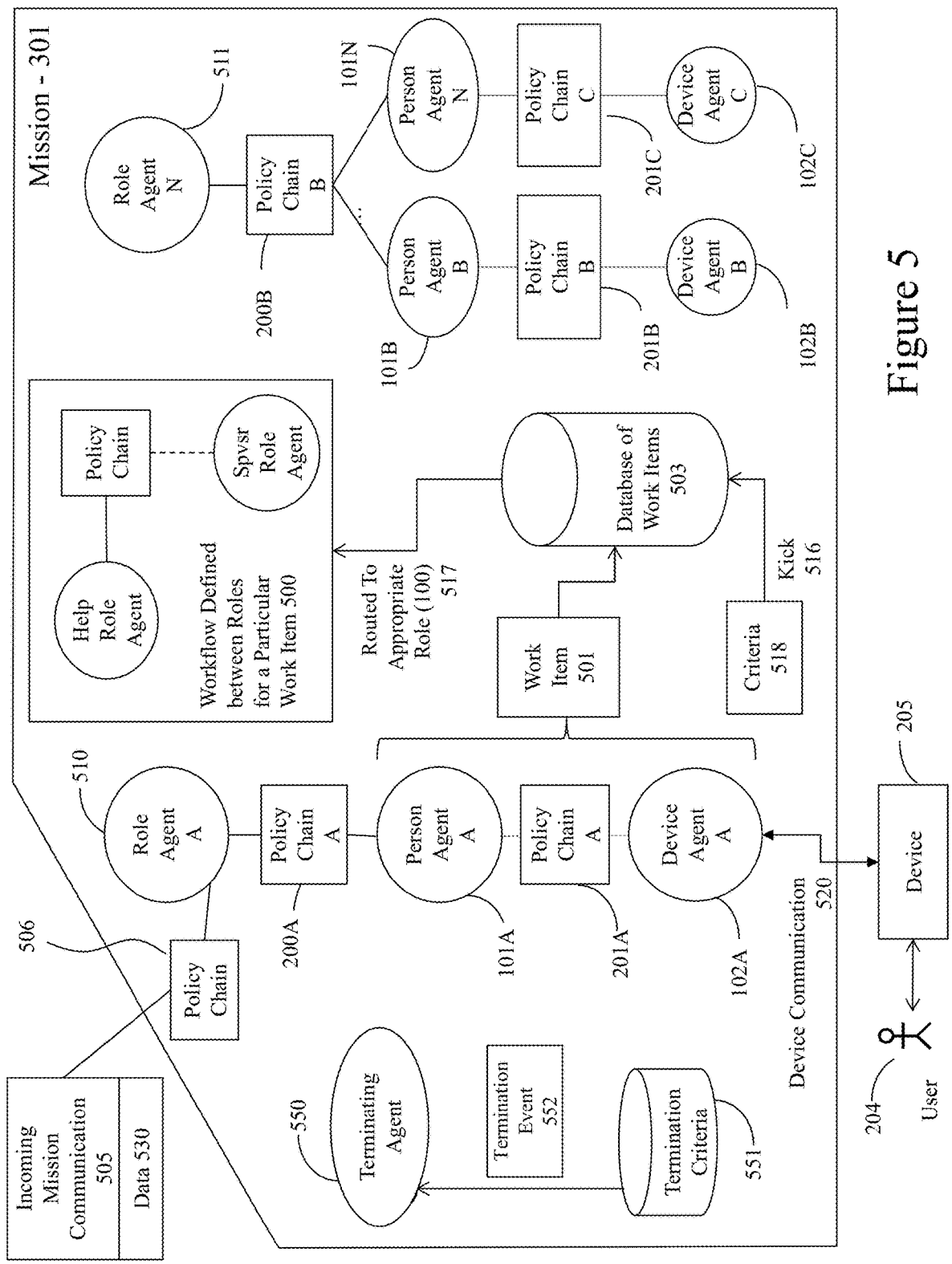
FIG. 5 shows the interaction between communications, role agents, person agents, device agents policy chains, policies and work items within a mission and a terminating agent for ephemeral systems.

Examples of collaboration tools are: Facebook, LinkedIn, Yammer, Telligent, Salesforce.com Chatter, Referring to FIG. 5, a communication 306 on the communication queue 305 comes to mission 301 through a policy chain 302 and gets put on a mission communication queue 505, and is routed 500 by a policy chain 506 using communication data 307 to the appropriate role agent 510 or 511. It follows a policy chain 200A or 200B to select the person agent 101A or 101B or 101N, and a policy chain 201A or 201B or 201 c to get the device agent 102A or 102B or 102C. The device agent 102A or 102B or 102C communicates 520 with devices 205. Communications 306 can come from external sources, or they can come from a device 205 associated with a user 204 represented by a person agent 101 in a particular role 100. This information may also be used to route the communication 306 through various policy chains 302, 506, 200, 201.

The user 204, using for example device agent 102A can create a new communication type called a work item 501, and add information to it. Work items 501 can contain many things, for example documents, or a series of communications of different types, related to the work item 501. The mission 301 has defined different "types" of work items 501 that the user 204 can choose from. Templates exist for the work items 501 that the user 204 will use to store any data. Once they are done, they can store it in a work item database 503. When criteria 518 are met a kick 516 causes 517 the work item 501 to be put on the communication queue 305, which through a policy chain 302 can be re-introduced to the mission 301 and put on the mission communication queue 505. When this happens, the work item 501 is routed to the appropriate role agent 510/511 via the policy chain 506. It could also go to another mission 301.

Part of the criteria 518 is a state that needs to be met (pre-programmed, or filled in by a user 204) for it to be ready to pass on to another role agent 100. As a user 204 adds to the work item 501, it is stored in a database 503 until the criteria 518 is met, or can automatically be passed on if it is. A timer (either set by the user 204 or the system) can be one of the criteria 518. A user interface will allow for the creation, saving and destruction of work items 501 and work flows 500 within the mission 301, or of the mission 301 itself. Criteria 518 can also be used to navigate through policy chains 302, 506 200, 201 as it is data in the work item 501.

Policy chains 302 and 506 then become workflows and create a workflow management system.

A user interface will allow for the fast creation and destruction of missions 301, and adding/deleting of services, tools, keywords, etc. in the mission 301.

An example where this can be used is in a help desk. A set of helper role agents 100 will be created within the mission 301 of a help desk. If an email, chat or voice call comes in to the help desk mission 301, it is first routed to a helper role agent (say role agent N 511) dependent on the type of help needed (determined by a policy chain 506 that looks at the data 307 in the incoming mission communication 306 and routes it accordingly). This helper role agent 511 can have a policy chain 200B that contains a group policy that groups person agent B 101B and person agent N 101N. Once a person agent 101B or 101N is chosen to handle the incoming mission communication 306, and the incoming mission communication 306 is directed via the device agent B 102B to the user 204, they can choose to turn it into a work item 501, pre-defined by the help desk mission 301. Once this is done, they can add entries to the work item 501 in the form of text, documents, etc. If the work item 501 needs more things to be completed (criteria 518), then it is stored in a database 503 until they are. The work item 501 can be re-introduced to the mission 301 based on pre-defined criteria 518. It can go back to the original helper role agent 511, and either be routed to the same person agent B 101B, or if that is not necessary, then to a new person agent N 101N assuming the helper role agent 511 to handle it further. Once all the criteria 518 have been met, then the mission 301 can route the work item 501 through a policy chain 506 to a supervisor role agent (say role agent A 510) (for example a problem has been solved, but it needs the okay from a supervisor before it can be closed). The supervisor role agent 510 it is routed to might be different based on data in the work item 501 (this will use a policy chain 506 using data from the work item 501 to route it to the right one).

Another concept is that of temporary or ephemeral missions 301 that receives incoming mission communications 306, but disappears after a period of time, dependent on for example a date or a person manually deleting it. Since it is a data driven system, a general template of the mission 301 developed for a particular situation with pre-defined role agents 100, device agents 102, policy chains 302, 506, 200, 201, policies 202 and 203 and work items 501 is set up. An instance of the mission 301 is created and the data for the people agents 102 and policies 203 is filled in and the correct connections made. A terminating agent 550 is responsible for destroying the instance of the mission 301 once the termination criteria 551 are met. Once the termination criteria 551 are met, a termination event 552 is sent to the terminating agent 550. The termination criteria 551 could be for example a time, or date, or a request from a user, or a combination of all factors.

Figure 6:
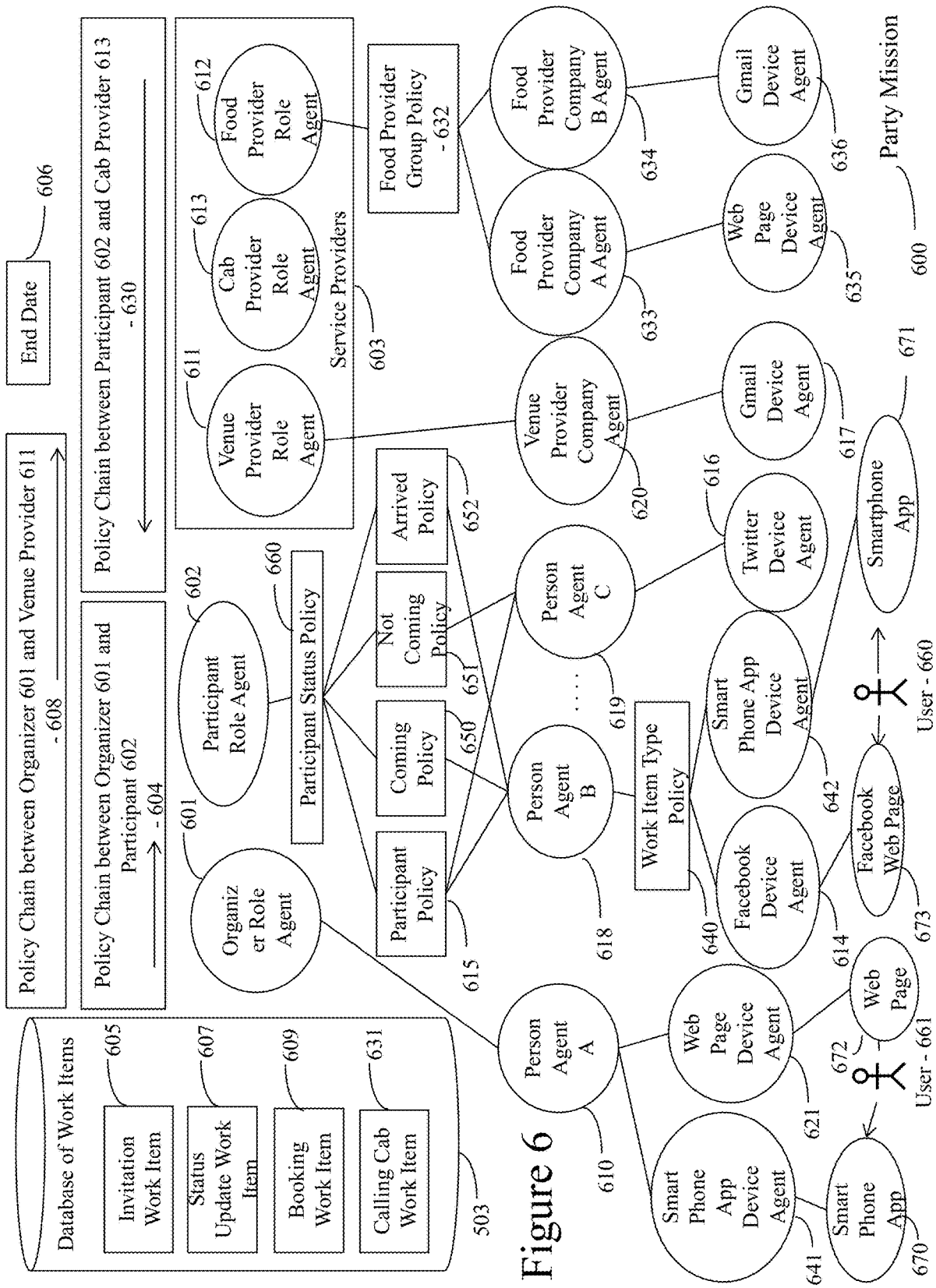
FIG. 6 shows a particular example of a party mission.

An example of this will be an application for setting up a party. FIG. 6 illustrates this. The party mission 600 will last from the initial start of the setup of the party, and last until its end date 606. Local companies can provide different services to the mission 600 (for example discounts on food or beverages, or cab rides), and they can fill service provider role agents 603.

Role agents can include: organizer role agent 601, participant role agent 602, venue provider role agent 611, food provider role agent 612, cab provider role agent 613. The user 661 can use pre-setup web pages 672 using the web page device agent 621 for initially creating the party and filling in the work items 501 with data.

Party specific work items 605, 607, 609, 631 are stored in the database of work items 503. A policy chain 604 between and organizer role agent 601 and a participant role agent 602 can involve an invitation work item 605 (which can include participants, a picture, some text, etc.), or a status update work item 607 for updating the status of the party to participants. Some examples of policy chains 608 between the organizer role agent 601 and the service providers 611 can involve a booking work item 609 for securing a venue for the party. A Gmail device agent 617 may be used to communicate to the venue provider. Another example of the policy chains 608 between the organizer role agent 601 and the service providers 611 will be to a food provider role agent 612, which can be filled by a group of food providers represented by a food provider group policy 632. The work item 609 is be passed to both the food provider company A agent 633 and the food provider company A agent 634, which can have different modes of communication represented by the web page device agent 635 and the Gmail device agent 636.

One or more person agents 610 (representing users 661) can fill the organizer role agent 601 and one or more companies 620, 633, 634 can fill the venue provider role agents 611, 612, 613.

A user 661 represented by person agent 610 and filling the organizer role agent 601 can use Facebook for adding participants through a web page device agent 621. They can select people from their friends list to send invitations to. Gmail (or any email service), or Twitter can also be used. As people 660 are added they get person agents created and defined (618, 619) and put into to the participant group policy 615 which will have a broadcast hunt type. The participant group policy 615 is connected to the participant role agent 602. Once the user 661 is happy with the invitation work item 605, it is passed to the participant role agent 602 as part of policy chain 604, which goes to the participant group 615 and sends out the invitation using the correct device via the Facebook device agent 614, or twitter device agent 616 (which is determined by the method used to select the person) for each user 660 represented by person agents 618, 619 invited. Attached to the invitation work item 605 can be a smartphone app 671 which communicates with the smartphone app device agent 642 which the user 660 can download to their smartphone (or any other wireless or wired device such as a tablet or personal computer) and use during the party. The app 671 can also be for example a web service handled via web pages or it can reside in Facebook. A work item type policy 640 can distinguish between what device to send an invitation work item 605 and another type of work item to.

As users 660 accept or decline the invite, the invitation work item 605 is updated accordingly and the person agents 618, 619 attach themselves to either the coming group policy 650 or the not coming group policy 651. A participant status policy 660 is used to route communications/work items 306, 501 to the correct one. Conversely, two new role agents can be created to handle coming and not coming.

The smartphone app 671 can gather data and send it to the smartphone app device agent 642 where it can be stored or passed on to the person agent or role agent. If location is known for some of the participants (derived by their smartphone and sent via the smartphone app 671 to the smartphone app device agent 642 and stored as data in the person 618), then depending on a time of day policy, offers of cab rides can be sent from a cab provider role agent 613 to one or more participants via policy chain 630 based on their current location (still at the party). The work item type policy 640 will send this work item 631 to the smart phone app device agent 642 which will notify the user 660 via the smartphone app 671.

Either location or a prompt on the smart phone app 671 that lets the smartphone app agent 642 know that the user 660 has arrived. As the person agent 618 receives the indication that the user 660 has arrived at the party, it can attach itself to the arrived group policy 652. Conversely, a new role agent can be created to handle arrived people.

During the party, updates are sent by the user 661 using a status update work item 607 and sent using policy chain 604 to either people not arrived at the party, or any of the other groups formed. Data, like for example a picture taken of the party, can be attached to the work item 607 and sent out.

Figure 7:
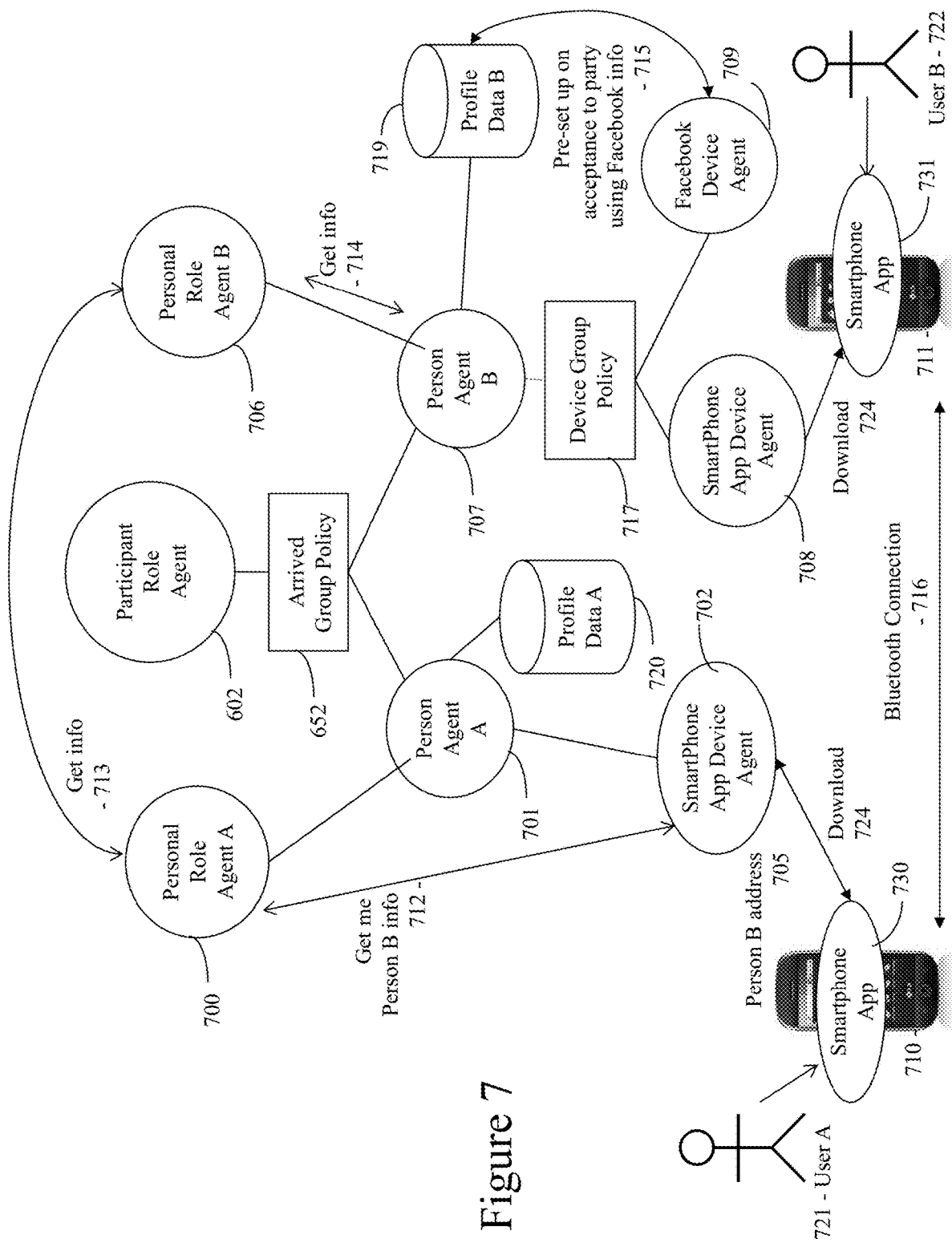
FIG. 7 shows an example of a game.

At the party, participants can be pushed information about a person close to them (possibly determined by Bluetooth), and using information about the person (possibly obtained via Facebook), then common interests can be pushed to the smartphone app 673. FIG. 7 shows an example of this. The smartphone app 703, 731 on smartphone 710, 711 is associated to a smartphone app device agent 702, 708 which is associated with the person agents and person agent B 701, 707 (representing user A 721 and User B 722) which through an arrived group policy 652 is associated to the participant role agent 602. The smartphone app 730, 731 was downloaded 724 to the smartphone 710, 711 on acceptance of an invitation 605 to the party (which will have been handled by a policy chain 604). Smartphones 710, 711 containing smartphone app 730, 731 can communicate using for example Bluetooth 716. When two smartphones 710, 711 are within the right distance, the smartphone app 730 which is associated with user A 721, can receive over Bluetooth the address of user B 722. Either by a prompt from the User A 721, or in the background, smartphone app 730 can ask for information 712 on user B 722. This gets sent by smartphone app device agent 702, through person agent 701 to personal role agent A 700. This gets relayed 713 to personal role agent B 706. When user B 722 accepted the party invitation 605, then a personal role agent B 706, and a person agent 707 were set up for them, and profile data 719 was stored, using information 715 from (for example) Facebook agent 709, which is a device that was connected to the person agent 707 when they accepted the invitation. Once person agent 701 receives this information, it can match common interests or people (using its own stored profile data 720) and send it to smartphone app 730 via smartphone app device agent 702. When it receives this information, it can prompt user A 721 with the appropriate information to start a conversation with user B 722.

Other game-like applications can be automatically downloaded to any device that a participant at the party has. A role-based game (like a murder mystery) can be set up ahead of time, with role agents knowing their persona, and people being assigned to them as they walk in, and a smartphone app can give them their instructions. Incentives to come to the party can be broadcast with the invitation, or later, for example free drinks to the first 20 to accept and show up.

Implementation of the games/work items/communications flowing through the system will follow the same rules as in U.S. Pat. No. 6,836,893. They are invoked the same as features are described at each of the three levels.

This idea can be expanded to cover weddings, conferences, or any social or business event. Once it is over, the mission 600 can be destroyed or saved for future reference.

A web page (which is a template automatically filled in by the mission 301 data) can be created that reflects the mission 301, including all the role agents 100, person agents 101, policies 202, 203, device 205 s, work items 501, work flows 500 and statuses, and can be a place for data (for example pictures) to be downloaded and shared. This can be provided as a cloud service, or an application.

Figure 8:
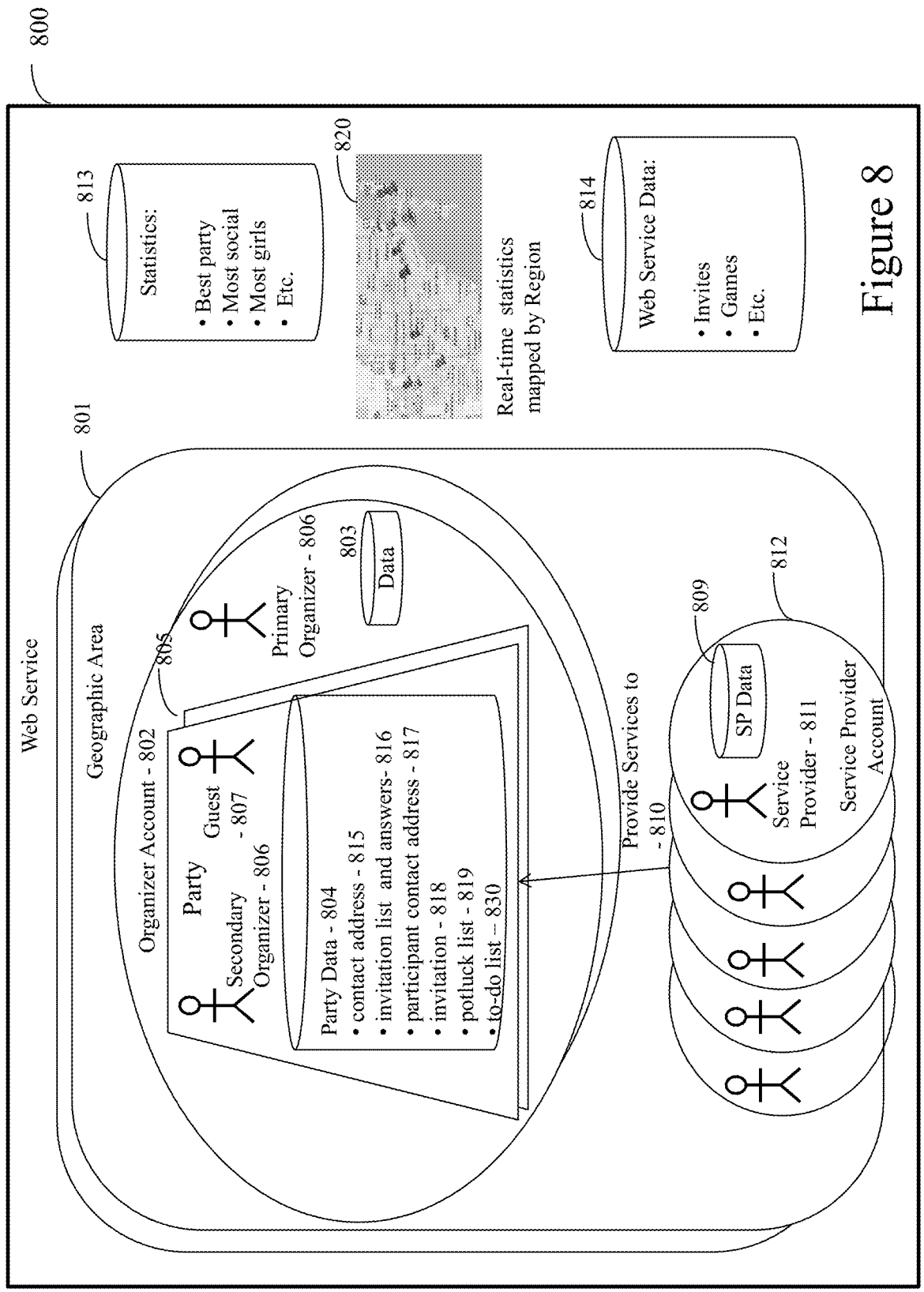
FIG. 8 shows the organization of elements involved in an example party mission.

FIG. 8 describes the party example in more detail, where each party 805 is a mission 600. In this example, the primary organizer 808, secondary organizers 806, guests 807 and service providers 811 are users 204. A person agent 101 is created for each, which is associated to a (personal) role agent 100. Once all the data is input for the party 805, the mission 600 is created based on the embodiment described in U.S. Pat. No. 6,836,893. Before a primary organizer 808 can create a party 805 (which is a mission 600) they need to have an organizer account 802. They can create the organizer account 802 for example from a web page, or a smartphone app 730. Different things are stored with the account as data 803 for example:
  Invitation templates created by the user
  Invitee lists with ranks for each entry (good, bad) that can be updated after a party
  A party, so it can be repeated easily. Can have an automatic countdown (like a campaign)
  Organizer accounts 802 can be customized (stored as data 803) with for example:
  Selection of radio stations to listen to while creating the party
  Types of offers the user wants to see
  Security options (what can and can't be seen and by who)
  Types of replies they want to get
  If they want automatic follow-ups to be done Before a service provider 811 can offer services 810 to a party 805 they need to have a service provider account 812. They can create the service provider account 812 from for example a web page, Facebook, or a smartphone app. The service provider 811 can tailor their account (stored in data 809) to for example:
  Provide service for particular types of parties, themes, number of people attending etc.
  A particular geographical region 801
  The data 809 is used at the person level 101 which in this case represents a company. This data 809 can be used for routing of incoming mission communications 306.

If there is more than one organizer for a party 805, the primary organizer 808 creates a party 805, and then adds secondary organizers 806 to the party 805. The new secondary organizers 806 are sent an email informing them of their role. Attached to the email are a link to the web site 800 and the link for downloading the smartphone app 641. The contact address 815 for the party 805 is the primary organizer's 806 email name (minus the @ and .com) & a unique party identifier & @website.com. The unique identifier starts at 1, and as the primary organizer 808 becomes the primary on other parties, it is incremented by 1. The contact address 815 is stored as part of the party data 804. All information about the secondary organizers 806 is stored within the party data 804. The primary organizer 808 can reuse the account 802 for different parties 805. Primary organizers 808 and secondary organizers 806 can add different modes of communication on top of their email address, for example Skype, Facebook, another email address, etc. (these become device agents 102) and can set each one as the primary method for different types of communication (which become part of the policy chain 201). They can also choose not to get certain types of communications (e.g. invitation replies).

The primary organizer 808 can set permissions (these will be restriction policies 203 at the person agent 101 level) on what other secondary organizers 806 can modify or do. For example, a secondary organizer 806 might be relegated to managing games, and another to managing bids, but neither one can update the invite list. Permissions include for example "Add a guest", "Delete a guest", "Manage games", "Send updates to various groups", and "Add to, check off and delete items from the to-do list."

The organizer(s) 808, 806 might choose to have the party 805 at multiple locations. If this is the case, then once the timetable (a work item 501) is established (stored as party data 804), reminders (incoming mission communications 306) can optionally be sent to organizers 808, 806 and arrived guests 652 when it is time to move on. Guests 807 and organizers 808, 806 can confirm this using the smartphone app 641, 642, so party goers can be kept track of All modifications to the party by any organizer 808, 806 are kept in a log.

The organizer(s) 808, 806 have access to a to-do list 830 stored in party data 804 and can add items to the list, and check off completed items.

Creating an invitation list 816 is done by the organizer(s) 808, 806. Contact information is imported from for example (either individually or as groups) including Google contacts, Facebook friends, LinkedIn connections, Outlook Contacts, Hotmail contacts, and Skype contacts.

As the guests 807 are imported into the party 805, their mode of communication is stored (which creates device agents 102), as well as any information about them that is possible to retrieve (stored in the person agent 101).

The invitation comes from the contact address 815, and is what is used to respond to the invite.

The invitation list 816 is stored against the party 805 in the party data 804 and in the organizer's account data 803, for possible reuse.

The invited group is given a unique participant contact address 817.

If a contact comes from an application that includes an email address, for example Facebook, then both Facebook and email are used to contact that guest 807 (both device agents 102 are added).

An example of an incoming mission communication 306 or work item 501 that can be sent to guests 807 is a polling invite. There is a list of items that the user can select to poll for, for example:
  Dates
  Themes
  Food (including allergies, preferences e.g. vegetarian)

This step can be skipped. The guests 807 receive this polling invite via the communication type they were imported with. The participant contact address 817 is used to send the invitation, and the "From" address is the contact address 815. The organizer 806, 808 chooses the items to add, which are imbedded in the polling invite. The reply comes back to the contact address 817 and follows a policy chain 506 to get to the organizers 806,808, and each organizer 806,808 receives the response using the device agent 102 of their choice. As well, the web service 800 keeps track of the answers and the web page for the party 805 using party data 804 invitation lists and answers 817, displays the answers and it also provides a suggestion as to which choice is the best one.

Once the invitation list 816 is done (a participant group policy 615 is created), the organizers 806,808 can set up an invitation 818 (which is a work item 501). Different styles of invitation (stored in the web service data 814) are given, depending on the theme, or the organizers 806,808 can create their own using a basic template that they fill in with custom text and pictures. This new invite 818 is saved in the party data 804. It is sent to the guests 807 via the participant contact address 817 and received via the communication type they were imported with. The "from" address is the contact address 817. Imbedded in the invitation 818 are three choices for the guest to select: Coming, Not Coming, Maybe. The invitation 818 might also have a "plus one", where the guest 807 can enter a communication address, so that person can be invited as well. The guest 807 might also want to include an alternate communication address for themselves. The invitation includes a link that provides the ability to download the smartphone app 642. This app can also be used by the guest 807 in the future to set up their own party. Preferences can be set up so that a calendar check can be done automatically on future invites.

If the smartphone app 642 is downloaded, part of the functionality provided by it is automatic Google map directions from where they are to the party location, just by pressing a button.

Another item that can be imbedded in the invitation 818 is a link to a potluck list 819. The web service 800 provides a page to display this. The guest is asked to check off an item they will be bringing. They have the ability to add detail. Their name is automatically added. All guests 807 can see this web page.

The invitation 818 can also include offers from service providers 811 on deals related to the party (e.g. costumes, cab rides, etc.). A web link will be included that gets the guest 807 to the appropriate site or the web service 800 can manage them if there is a threshold to be reached before the offer is valid.

The invitation 818 can also include a link to a gift registry.

The reply comes back to the contact address 817 and follows a policy chain 506 to get to the organizers 806,808, and each organizer 806,808 receives the response using the device agent 102 of their choice. As well, the web service 800 uses the answers 816 that are stored in the party data 804 and the web page for the party displays them.

Three new group policies are created coming group policy 650, not coming group policy 651 and maybe group policy. These groups will be visible to the organizers 806, 808 on a web page.

The primary organizer 808 can choose whether or not they want automatic follow-ups done. This will entail a programmable reminder being sent (prompted by a kick 516 for a work item 501), either automatically, or after the primary organizer 808 okays it. The reminder will go to non-responders and optionally the coming group.

The primary organizer 808 can delete a party 805, and if it hasn't taken place yet, but invites 818 have been sent, then a new message is sent informing the guests of the cancellation. If a guest 807 is deleted from the party 805, then they are sent a message informing them that the party 805 (for them) has been cancelled.

When the party 805 is created the primary organizer 808 is presented with a list of service providers 811 that want to bid on the event. For a service provider 811 to participate, they need to provide what services they want to offer. The primary organizer 808 picks the types of services they want, and an email is sent out to all the registered providers. Responses are sent from the contact address 815, and all replies are routed via a policy chain 506 to the organizers 808, 806. These are also put into a web page provided by the web service 800 for easily choosing which ones to accept. The service providers 811 can also access a web page to see what parties 805 are available to bid on. Service providers 811 can automate the sending of bids based on criteria like location, date, size, payment method, which they can pre-program into the system and store in the service provider account data 809, and update whenever they need to.

Party organizers 808, 806 post their party 805 (including location and services they need) and service providers 811 are notified (they can monitor different "keywords") if they have a match, and then they can post bids for particular party services.

The smartphone app 641,642 can be integrated with, for example Foursquare, so that if anyone with the smartphone app 641,642 walks into a store owned by a service provider 811, the smartphone app 641,642 tells you party 805 deals.

As guests 807 arrive at the party, and they have the smartphone app 642, then they can either use the smartphone app 642 to update their status, or the smartphone app 642 can determine their location and prompt them to say they have arrived, or do it automatically. A new arrived group policy 652 is created. The web service 800 party web page is also updated to reflect this group, and the organizers 808, 806 can use it for playing games or sending out communications. When a guest 807 leaves the party, they are removed from the arrived group policy 652, and they can use the smartphone app 642 to update their status and rank the party (which will be stored in the party data 804 and in the web service 800 statistics 813), or the smartphone app 642 can determine their location and prompt them to say they have left, or do it automatically.

At any time before during or after the party, a message can be sent to the various different groups created (615, 650, 651, 652). The organizers 806, 808 or guest 807 just chooses which group or groups (615, 650, 651, 652), creates their incoming mission communications 306 (possibly with attachments), and it is sent to the appropriate people (618, 619) using the appropriate device agent 102. Pre-canned messages are available to for example:

Update guests on who is coming

Remind maybes and not-yet-answered invitees

Update guests on the potluck list

Update guests on who has arrived at the party

Send video or audio messages to all the people that haven't arrived

Games available from the web service 800 (stored in the web service data 814) are chosen by the organizers 806, 808 and are delivered from the web service using the smartphone app 641, 642. The organizers 806, 808 may have to control the game from a special web page. Some possible games are:

Ice Breaker: uses Bluetooth and the smartphone. Can use for example Facebook to determine common interests then pushes them to the smartphone app 642, or sends queries to guests 807 via the smartphone app 642 to, for example: find the person who . . . .

Murder Mystery: assigns role agents 100 as users 204 come in the door (location based), pushes information, clues etc. to the smartphone app 642. The organizers 806, 808 can use a web page provided by the web service 800 to manage game.

Before, during and after the party 805, service providers 811 can send offers targeted at different groups (organizers 808, 806, or participant groups 615, 650, 651, 652). These can be location-based or time-based.

The web service 800 can provide a geographically-based 801 map 820 of all parties 805 taking place in real-time. Organizers 808, 806 have the option of whether or not they want their party displayed. This map 820 can also be seen by service providers 811 so that they can see where parties 805 are taking place. Statistics 813 can be shown on the map. The parties 805 can be ranked and show different colours depending on their rank, or the number of people at them, etc.

Figure 9:
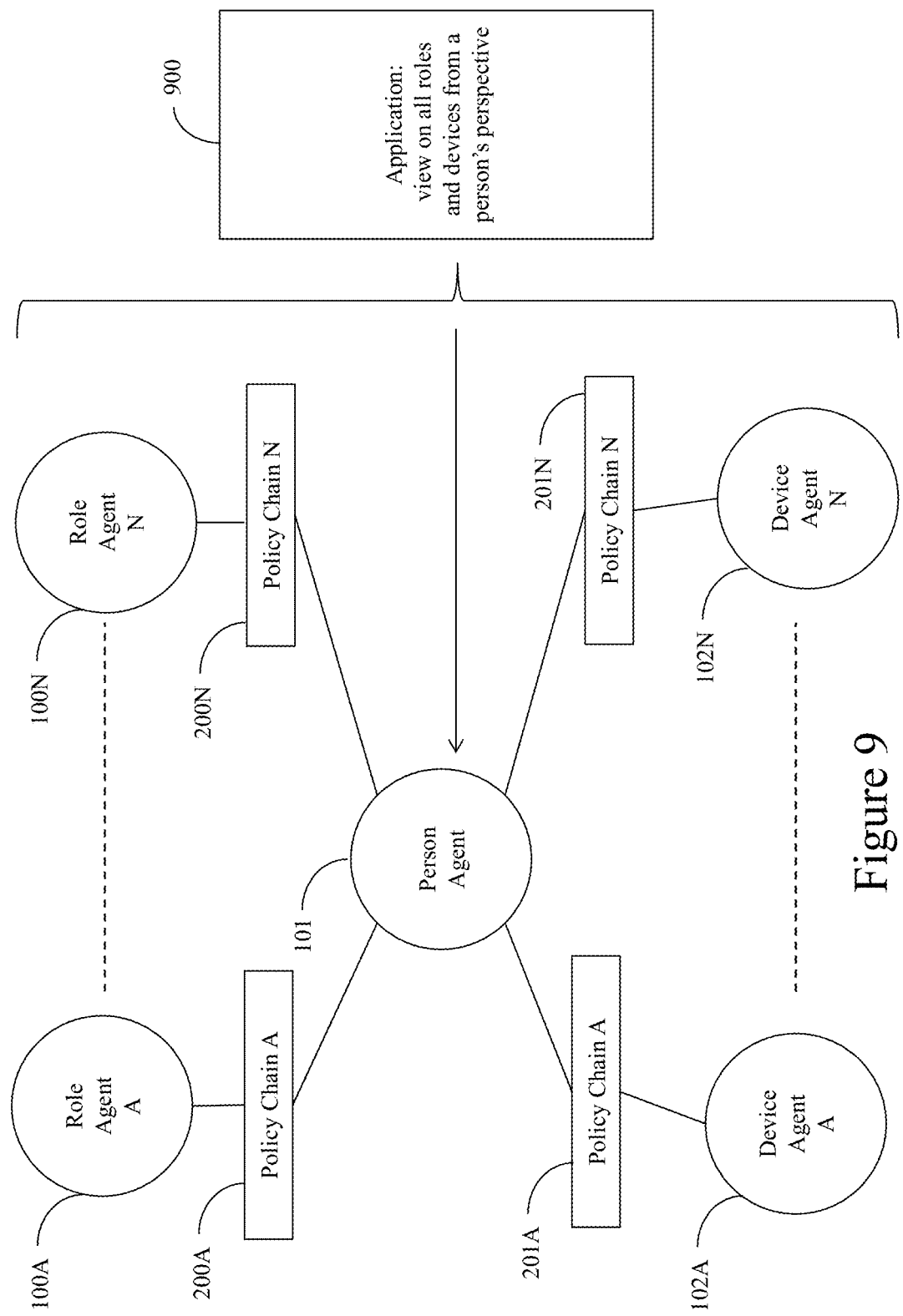
FIG. 9 illustrates the perspective of a particular application in accordance with the invention.

Another part of the embodiment is a user interface that lets a user 204 manage their various roles and devices within the missions they are a part of FIG. 9 points out the perspective of the application 900 that is being described for user 204. A person agent 101 can be connected to many role agents (100A, 100N) through different policy chains 200A, 200N. They can also be connected to many device agents 102A, 102N through policy chains 201A, 201N.

Being able to manage all the work flows and communications that happen for a particular role can become cumbersome for a user 204. An application that lets them easily switch context between roles and have all devices associated to that role be visible is now described.

FIGS. 10-20 illustrate a sample user interface (UI), and the concepts shown can be implemented in various different ways, with buttons per role agent, or tabs per role agent, etc. The version shown is for a PC or tablet, but a different smaller version using the same concepts, just a different look will be used for a smartphone. These features can be implemented using appropriate software modules.

Figure 10:
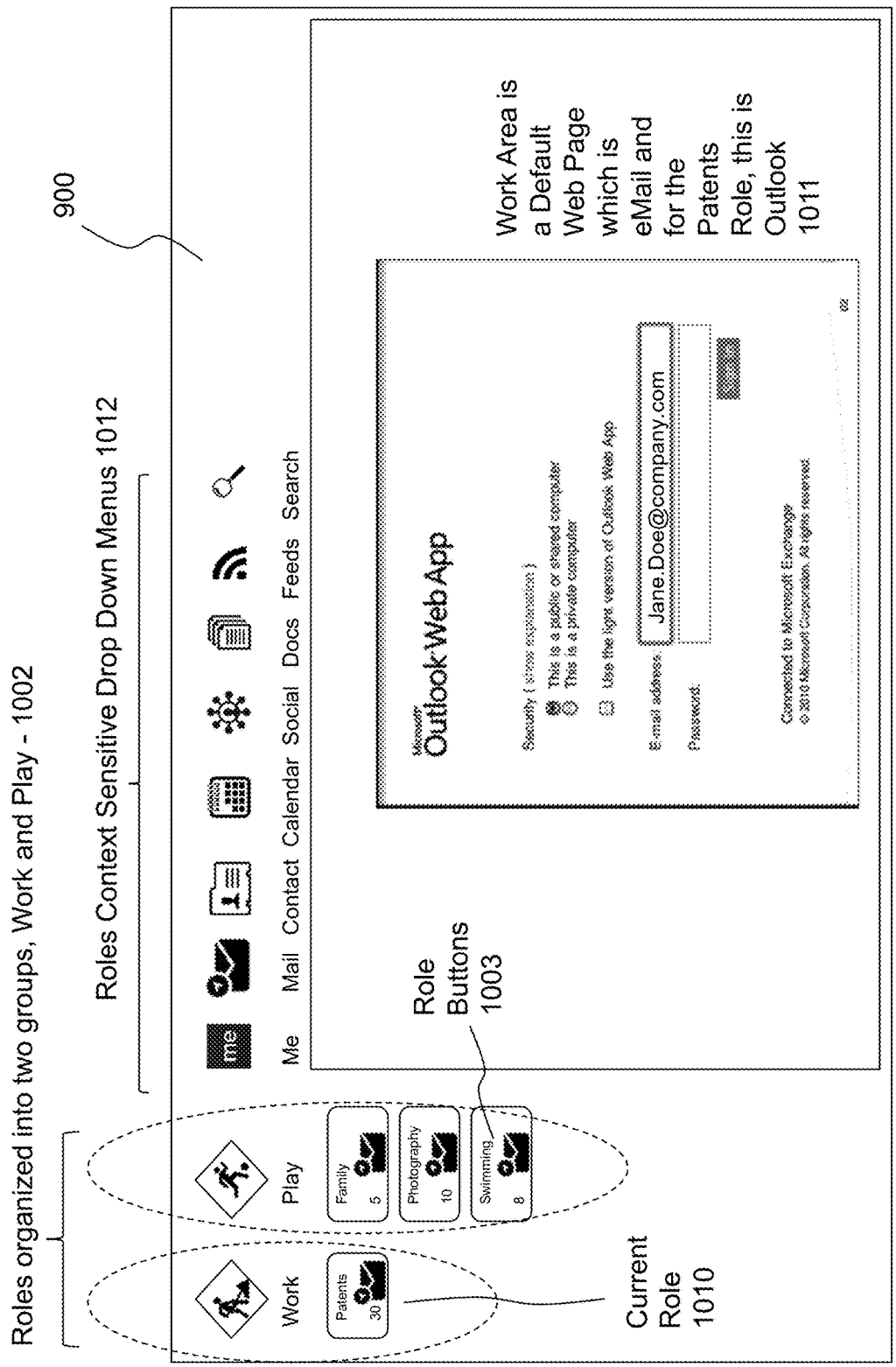

FIG. 10 is a sample user interface for the application 900 which can be local or cloud-based and implemented as a web-page, thin-client or a full desktop or smartphone app. It is depicting an application 900 running after the data for a mission 301 has been entered, and consolidating the various roles 1003 (represented by role agents 100) and devices 205 (represented by device agents 102) for user 204 (represented by person agent 101) entered, and running them in real time. It is taken from a particular user 204 represented by the person agent 101 perspective; it is divided into two groups, work and play 1002, and shows different roles 1003, which can be permanent, or show up based on logging-in to the role, or by any policy 202 that links the role agent 100 to the person agent 101 that is activated, for example time of day. Each role 1003 can have a message waiting indicator 1013 which is specific to the particular role 1003. Role context sensitive drop down menus 1012 change based on role 1003, and constitute aggregations of web-page based or application based devices 205 for a particular role 1003. When a Role 1003 is chosen, the work area contains a default window 1011 which can be defined, here it shows email and in particular Outlook as the default web page shown in the work area for the patents role.

Figure 11:
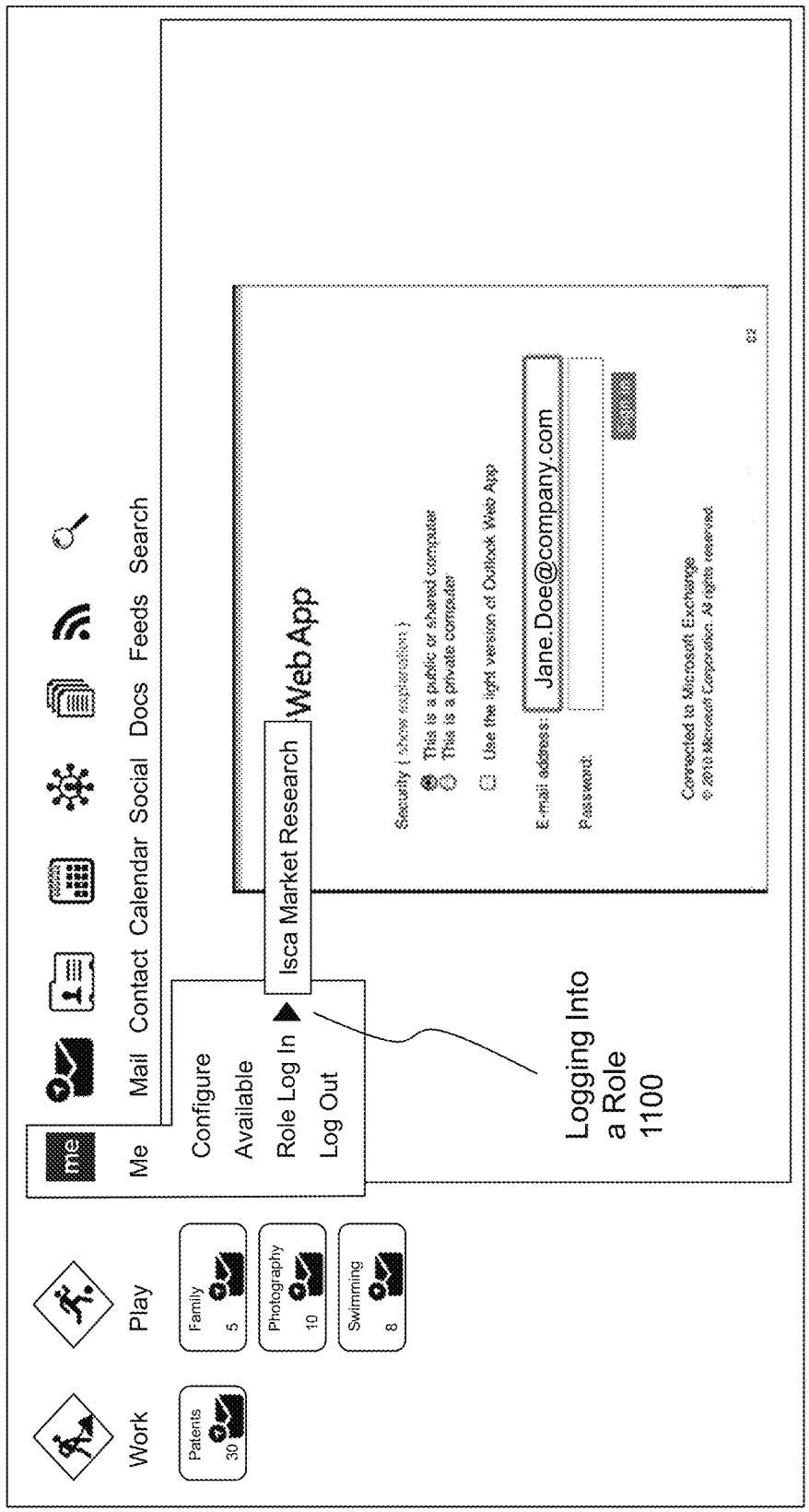
Figure 12:
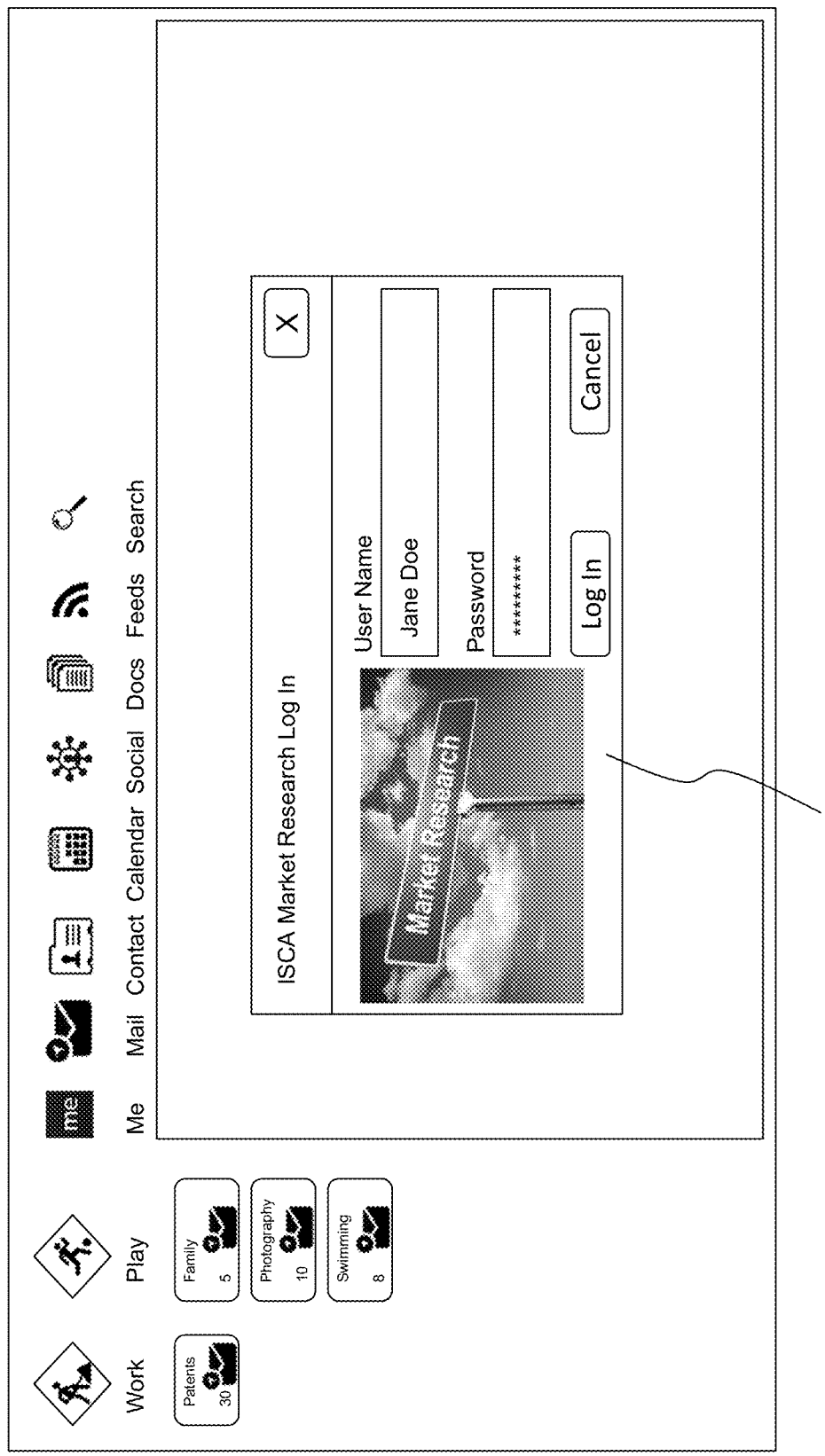

FIGS. 11 and 12 show that roles 1003 can also be logged in to 1100, and that credentials 1200 may be needed. Once successfully logged in, the role will show up in either the work or play 1002 column.

Figure 13:
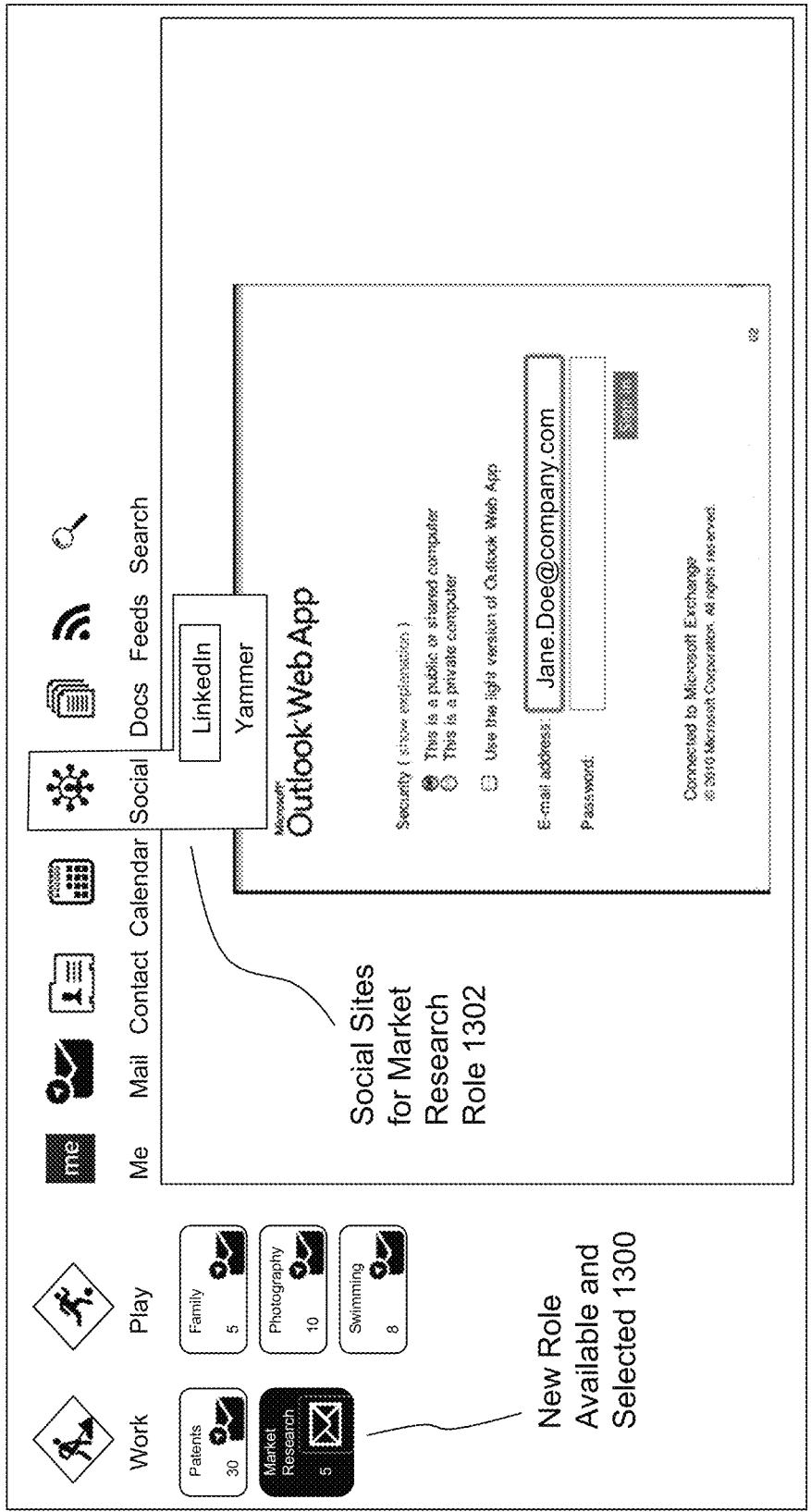

FIG. 13 shows that the new market research role is available and selected 1300, and that the role context sensitive drop down menus have changed for the market research role 1301. For example, the social drop down shows LinkedIn and Yammer as social sites for the market research role 1302.

Figure 14:

FIG. 14 shows the feeds drop down for the market research role 1400, and when chosen the work area is a web page for the small business feed 1401.

Figure 15:
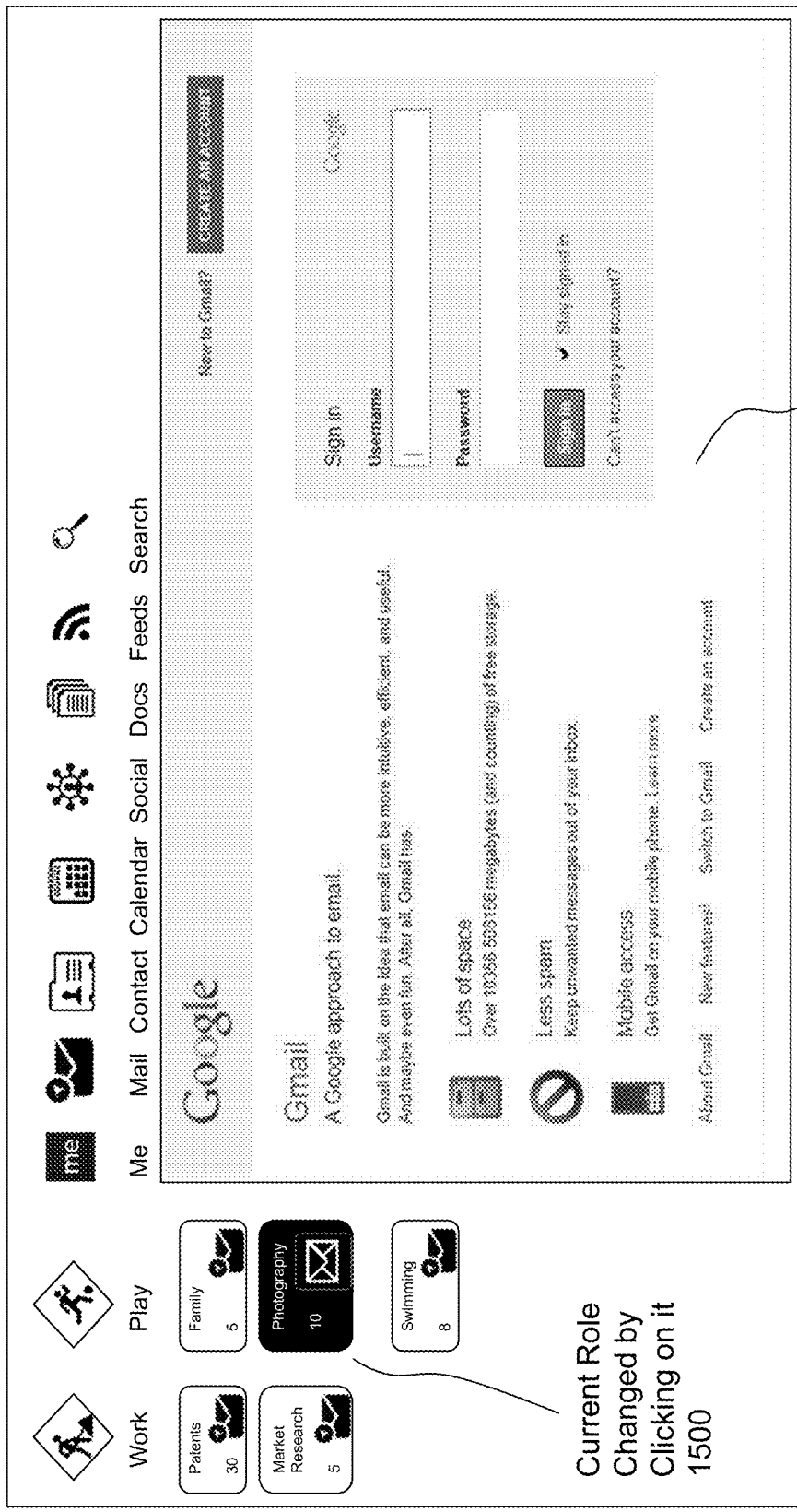

FIG. 15 shows that the current role can be changed by clicking on it 1500, and the default web page put in the work area is email for the photography role, and Gmail in particular 1501.

Figure 16:
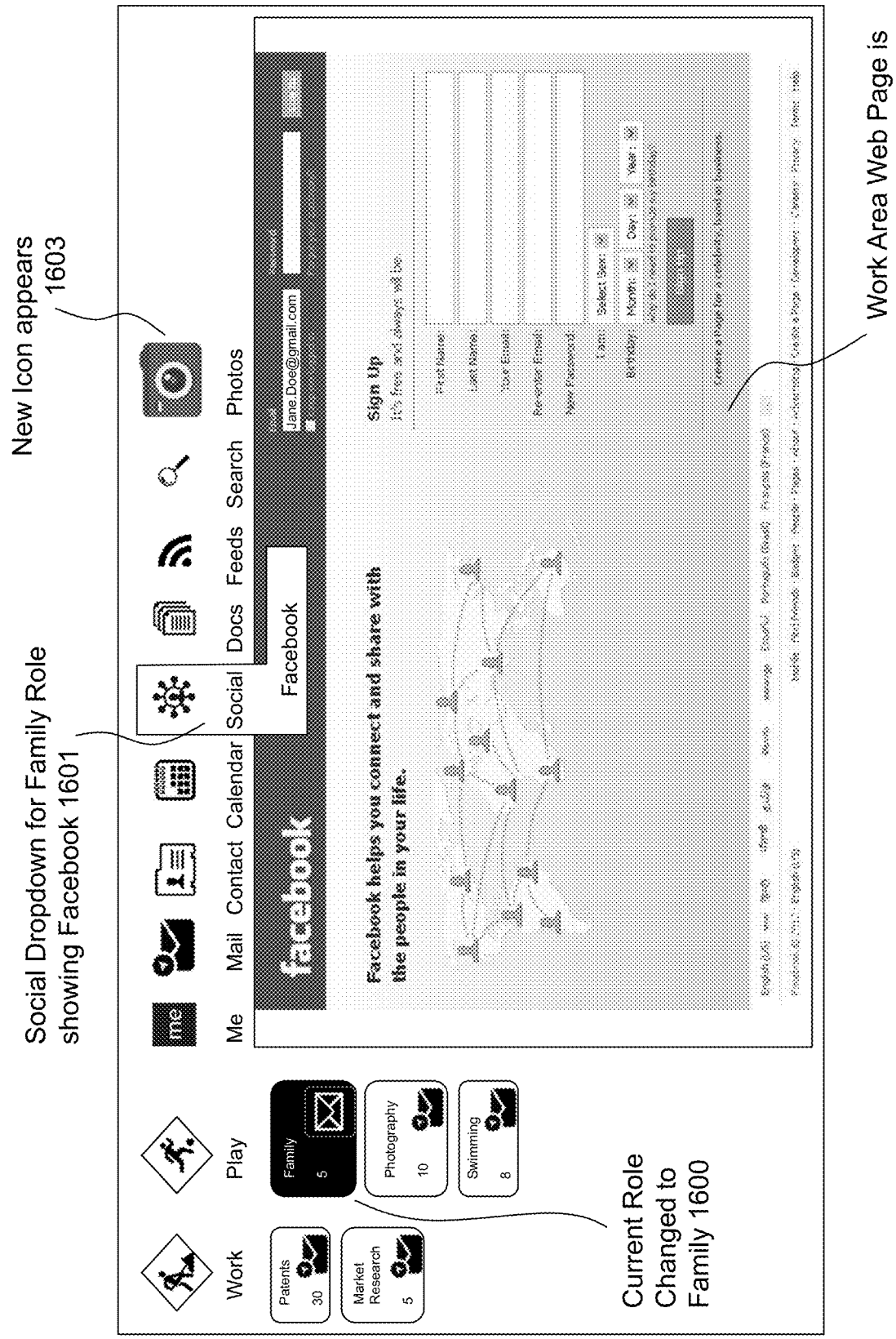

In FIG. 16, the role is changed to family 1600 (by selecting it), under the social dropdown Facebook is selected 1601 and the work area changes to the web page for Facebook 1602. A new drop down icon can appear 1603 (in this example photos) associated to the family role.

FIG. 17 depicts a role button 1003 which can appear time-based, for example a call center agent shift starts 1700. The new role button will appear, and there might be a log in sequence needed. The work area contains an agent screen 1701.

Figure 18:
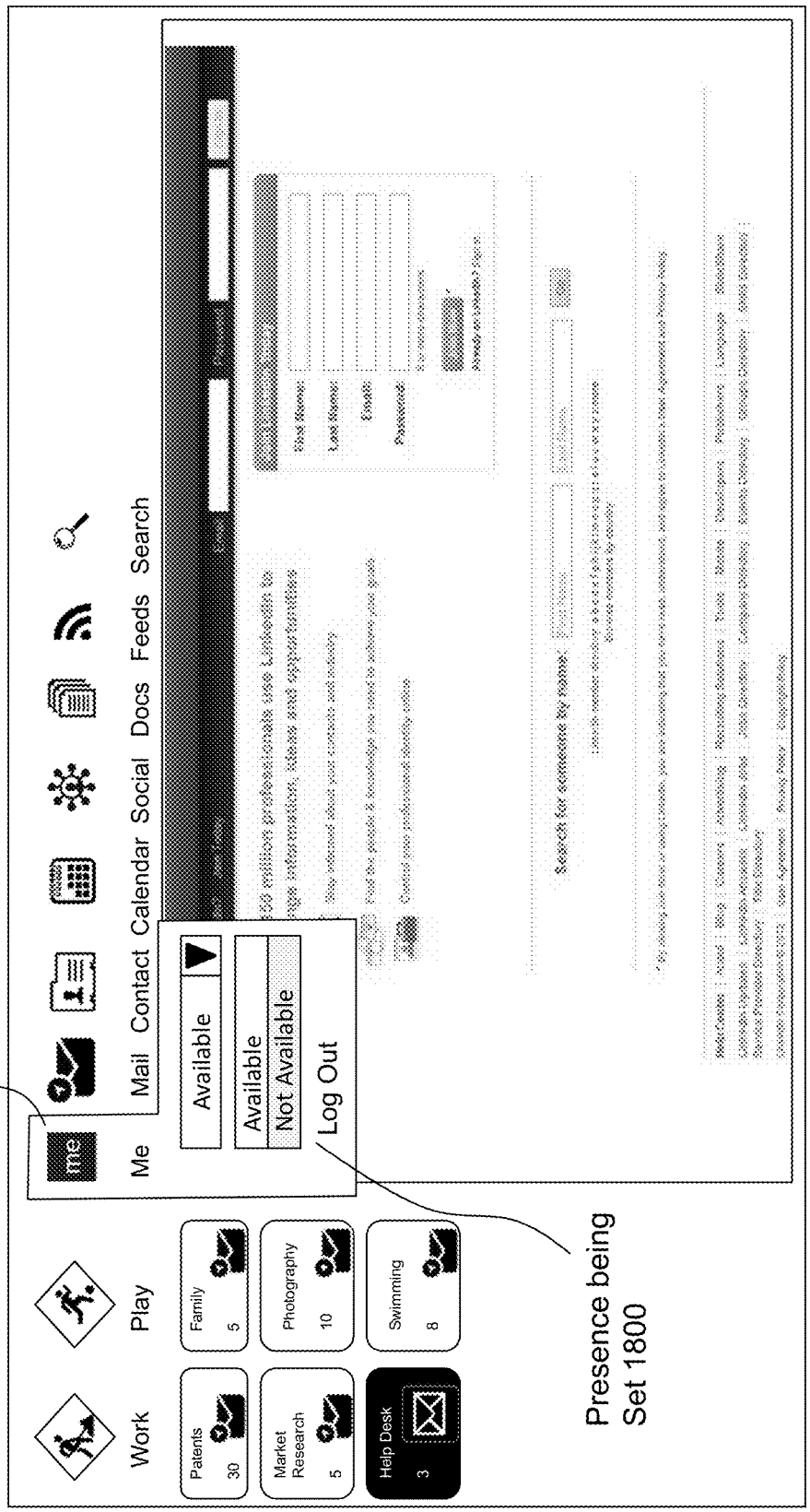

In the icons, the user 204 is represented by the Me icon 1801, and FIG. 18 shows that presence 1800 can be set on behalf of the user 204, independent of the role 1003 they are in, and this can be propagated to various different device agents 102 like Facebook or Skype automatically, without the user 204 having to go to each one individually and do it. Presence can be set for a particular role, a subset of roles, or all roles. Anything that the person agent 101 can do on behalf of the user 204 independent of the role 100 they are in can be put in here.

Figure 19:
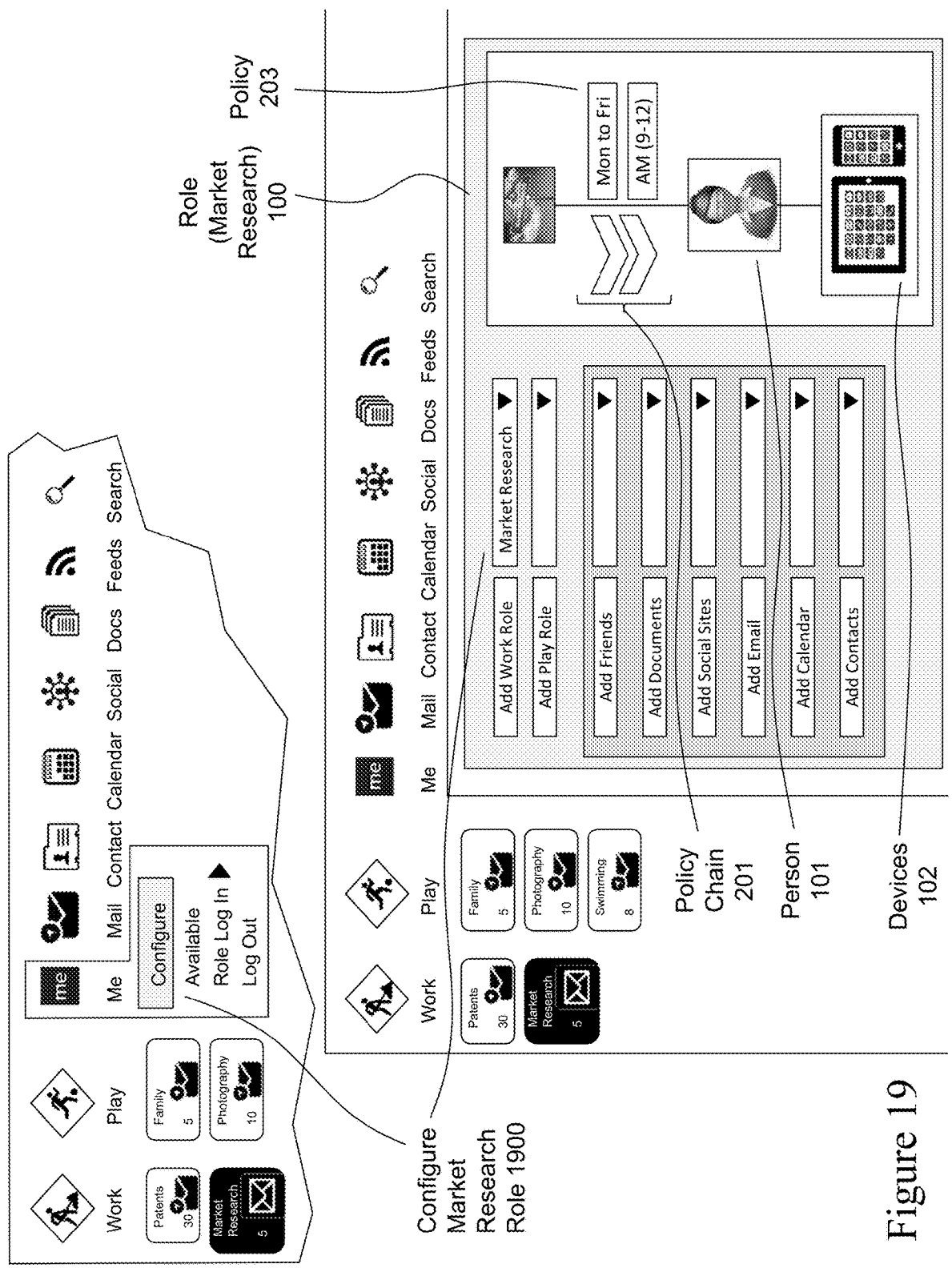

FIG. 19 shows that another thing that the user 204 can do is configure each role 1003, in this example, the market research role 1900. The policy chaining 200, and policies 203 between the role 100 and the person 101 (and between the person 101 and the devices 102—not shown) can be set up and edited by the user 204.

Figure 20:
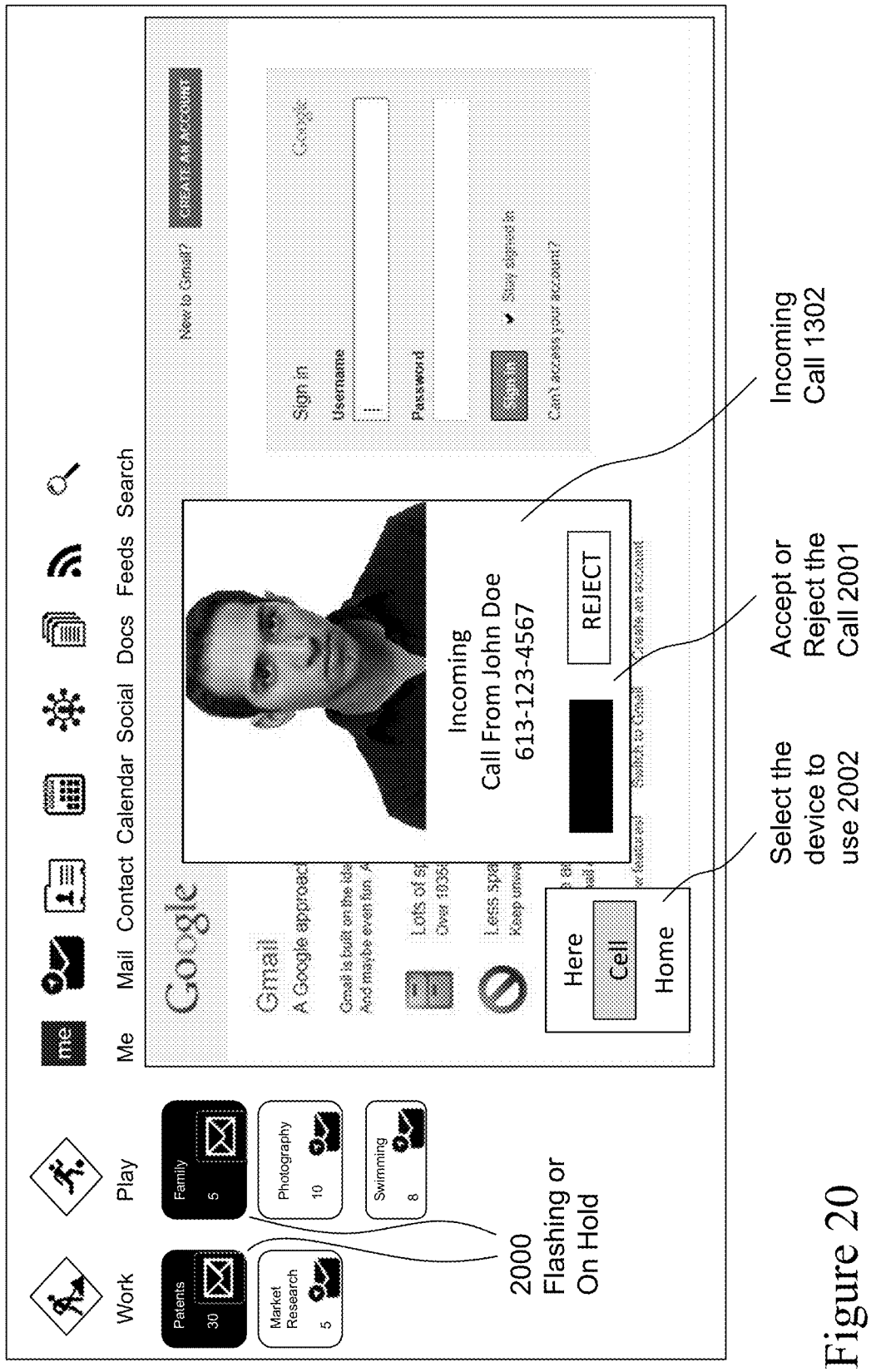

FIG. 20 shows that the created and defined roles 1003 actually become line appearances (in telephony terms) 2000 and can flash or indicate on hold (for calls), and communications (calls, emails, chats, etc.) can be directed to the role agents 100 for this user 204. It also gives the user 204 the ability to accept or reject the communication 2001, and if accepted, actually choose the device to send it to 2002 (which will be determined by the role agent 100 and the associated device agents 102). When making outbound communications, a directory of roles 1003 gives indications of how the role 1003 can be contacted at this moment. The user 204 selects the method and the system is what selects how to call/email/chat/etc. with them, and the outcome is determined by the user 204 and the devices 205 they have available to them in their role 1003. This may sometimes require a translation to be done (for example from text to speech if an email is sent and a smartphone in a car is the only device available at the time and a policy 202 based on speed (which is data stored in person agent 101) is followed to get to the device 205).

Figure 21:
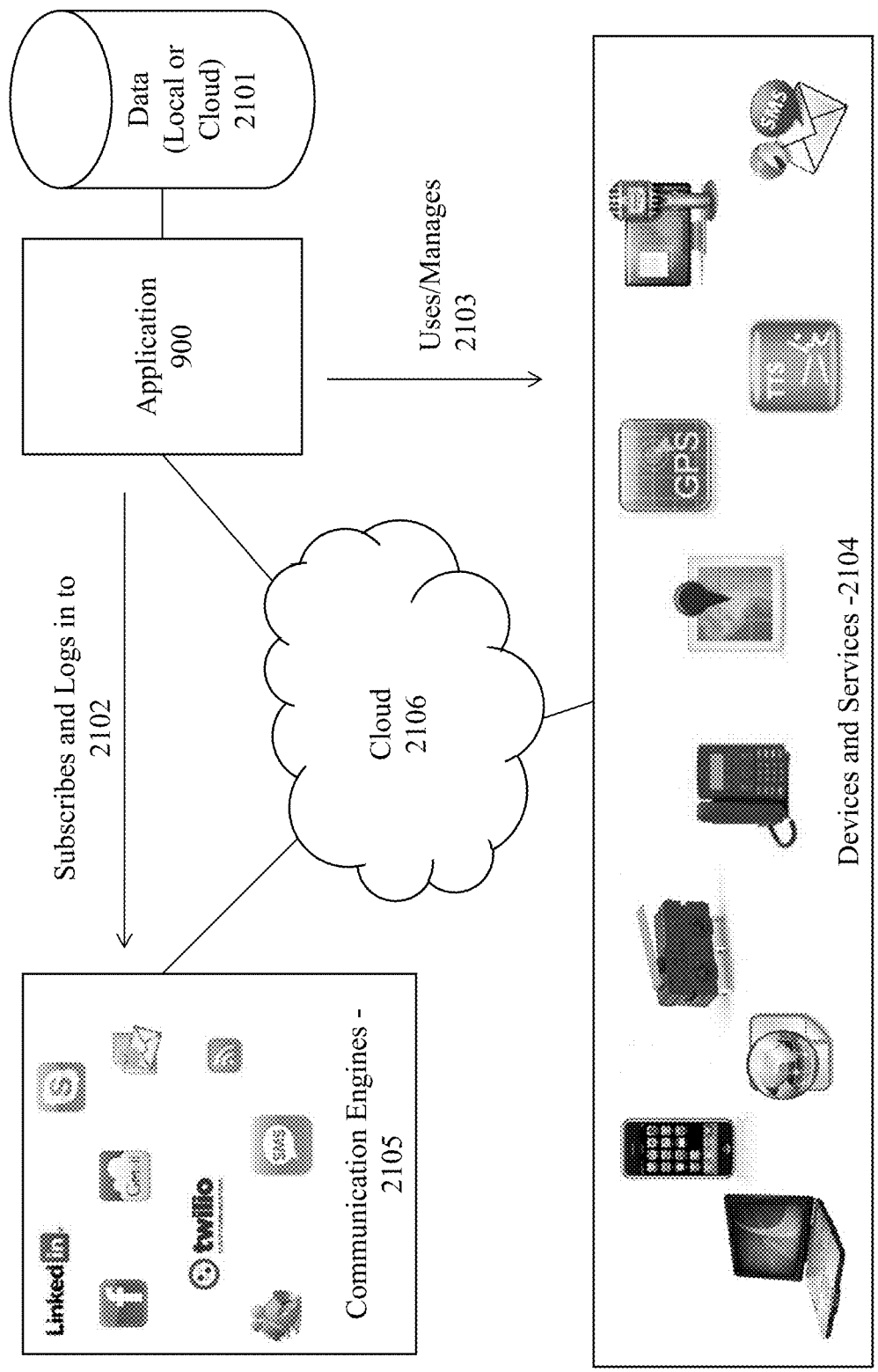
FIG. 21 shows an embodiment in a cloud environment.

FIG. 21 shows the application 900 and corresponding data 2101 can reside stand-alone on a desktop, or on a server in the cloud, serviced either by a web page, or a thin client/server combination or by a desktop or smartphone application. The application 900 subscribes to and automatically logs-in to (2102) communication engines 2105 whose content can be displayed using a web page as a device. It also uses and manages (2103) devices and services 2104 which are also attached to the cloud 2106.

While particular embodiments and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

What is claimed is:

1. A system for implementing, managing or running a communication or workflow management system having multiple role agents representing roles, person agents representing users and device agents representing a plurality of devices, said system comprising
a server comprising a first microprocessor and a first memory storing first data and first computer executable instructions wherein the first computer executable instructions when executed by the first microprocessor configure the server to:
combine a plurality of said role agents and their associated person agents and device agents into at least one mission of a plurality of missions;
link said role agents to said person agents with a first policy chain of a plurality of policy chains associated with the at least one mission of the plurality of missions; and
link said person agents to said device agents with a second policy chain of the plurality of policy chains associated with the at least one mission of the plurality of missions;
the plurality of devices each a second microprocessor and a second memory storing second data and second computer executable instructions wherein the second computer executable instructions when executed by the second microprocessor configure a device of the plurality of devices to:
render to a user associated with the device of the plurality of devices a graphical user interface (GUI) comprising:
render to a user associated with the device of the plurality of devices one or more portions of one or more graphical user interfaces (GUIs) comprising:
a first portion rendering a predetermined subset of the plurality of missions to the user which are established in dependence upon the person agent automatically associated with the user;
a second portion rendering a first context sensitive work area comprising a plurality of navigation elements automatically established in dependence upon a mission of the predetermined subset of the plurality of missions selected by the user in the first portion and a current user role, the current user role being a role of the plurality of roles associated with the user for the selected mission of the predetermined subset of the plurality of mission; and
one or more third portions each comprising a second context sensitive work area rendering content in dependence upon a navigation element of the plurality of navigation elements selected by the user within the second portion wherein the rendered content is role dependent data automatically established in dependence upon the current user role of the user, the selected mission of the predetermined subset of the plurality of missions and the selection made by the user with respect to the navigation element of the plurality of navigation elements rendered within the first context sensitive work area; wherein
the first data comprises
a first subset relating to the roles, users, and plurality of devices;
a second subset relating to the plurality of missions; and
a third subset relating to plurality of policy chains;
each mission of the plurality of missions comprises the said role agents and their associated person agents and device agents, a plurality of work items instantiated with connections to the said role agents filled with data, and adapted to receive communications; and
the first computer executable instructions further configure the server to distribute received communications for each mission of the plurality of missions.

2. The system according to claim 1, wherein
each mission of the plurality of missions comprises predefined role agents, person agents, device agents, policies, policy chains, and work items, instantiated with appropriate connections and filled in with data;
each mission of the plurality of missions is adapted to receive incoming communications; and
the distributed received communications for each mission of the plurality of missions are a subset of the received incoming communications for that mission of the plurality of missions.

3. The system according to claim 1, wherein
content rendered to the user within each second context sensitive work area comprises a drop down menu;
options rendered to the user upon selection of the drop down menu are established in dependence upon the current user role; and
the current user role was selected by the user upon the plurality of user roles being rendered to the user within the second portion of the GUI.

4. The system according to claim 1, wherein
the first portion further comprises a plurality of role context sensitive drop down;
the plurality of role context sensitive drop down menus are established in dependence upon the current user role which is either automatically established by the system or established by the user from the plurality of user roles currently associated with the user based upon their selection of a mission from the predetermined subset of the plurality of missions.

5. The system according to claim 1, wherein
the second computer executable instructions when executed by the second microprocessor further configure the GUI to render:
a first pop-up window upon selection by the user of a second representation relating to a pending communication comprising an indication of the another user the communication is from, a first user interface element to accept the communication and a second user interface element to reject the communication; and
a second pop-up window upon the user selecting the first user interface element providing a list of devices to route the communication to; wherein
the list of devices is established in dependence upon a policy chain of the plurality of policy chains determined by a role agent associated with the current user role of the plurality of user roles previously selected by the user and the device agents associated with the role agent.

6. The system according to claim 1, wherein
the second computer executable instructions when executed by the second microprocessor further configure the GUI to render to the user:
a map of a defined geographical area; and
at least one of:
different indicators for each event associated with the plurality of missions currently occurring in real time within the defined geographical area;
data relating to a statistic of a set of statistics selected by the user relating to at least one of all events and an event where the at least one of all events and the event are associated with a mission of the plurality of missions occurring in real time within the defined geographical area selected by the user; and
data relating to a statistic of a set of statistics selected by the user relating to all events associated with the plurality of missions occurring in real time within the defined geographical area; and
the different indicators are established in dependence upon the selected statistic of a set of statistics selected by the user.

7. The system according to claim 1, wherein
the first portion, the second portion, and the one or more third portions are established in dependence upon a device of the plurality of devices associated with the user via the device agent associated with the user and the selected mission of the predetermined subset of the plurality of missions via the second policy chain of the plurality of policy chains.

8. The system according to claim 1, wherein
the current user role is selected by the user selecting a graphical user interface (GUI) interface element of a plurality of GUI interface elements currently rendered to the user; and
the plurality of GUI interface elements comprises:
a first subset which are permanent;
a second subset which are only rendered in dependence upon the user logging into a role of the plurality of roles;
a third subset which are only rendered when activated by a policy chain of the plurality of policy chains associated with the selected mission of the predetermined subset of plurality of missions; and
a fourth subset are dynamically rendered where each GUI interface element of the fourth subset of the plurality of GUI interface elements is associated with a role of the user and the fourth subset of the plurality of GUI interface elements are automatically and dynamically defined in dependence upon a current set of role agents associated with one or more person agents associated with the user by the one or more first policy chains of the plurality of policy chains associated with a subset of the plurality of missions with which the user is associated by their one or more person agents.

9. The system according to claim 1, wherein
at least one of the first portion, the second portion and the third portion are dynamically and automatically adjusted in dependence upon a change of role of the user; and
the change of role is defined by a set of role agents associated with one or more person agents associated with the user by the one or more first policy chains of the plurality of policy chains associated with a subset of the plurality of missions with which the user is associated by their one or more person agents.

10. The system according to claim 1, wherein
the server distributes the received communications for each mission of the plurality of missions in dependence upon a third policy chain of the plurality of policy chains associated with the at least one mission of the plurality of missions.

11. The system according to claim 1, wherein
the server distributes the received communications for each mission of the plurality of missions in dependence upon a third policy chain of the plurality of policy chains associated with the at least one mission of the plurality of missions; and
the received communication distributed by the server for a mission of the plurality of missions was generated by another mission of the plurality of missions thereby allowing communications to be routed between missions of the plurality of missions.

12. The system according to claim 1, wherein
the server distributes the received communications for each mission of the plurality of missions in dependence upon a third policy chain of the plurality of policy chains associated with the at least one mission of the plurality of missions; and
the received communication distributed by the server for a mission of the plurality of missions was generated by the mission of the plurality of missions.

13. The system according to claim 1, wherein
the server distributes the received communications for each mission of the plurality of missions in dependence upon a third policy chain of the plurality of policy chains associated with the at least one mission of the plurality of missions; and
the received communication is from an external source to the system for implementing, managing or running the communication or workflow management system.

14. The system according to claim 1, wherein
the server distributes the received communications for each mission of the plurality of missions in dependence upon a third policy chain of the plurality of policy chains associated with the at least one mission of the plurality of missions; and
the third policy chain of the plurality of policy chains is a status policy relating to a status of person agents associated with that mission of the plurality of missions.

15. The system according to claim 1, wherein
the server distributes the received communications for each mission of the plurality of missions in dependence upon a third policy chain of the plurality of policy chains associated with the at least one mission of the plurality of missions; and
a user associated with a person agent associated with a mission of the plurality of missions can choose to not receive distributed received communications of a predetermined type.

16. The system according to claim 1, wherein
the server distributes the received communications for each mission of the plurality of missions in dependence upon a third policy chain of the plurality of policy chains associated with the at least one mission of the plurality of missions; and
a user associated with a person agent of a predetermined mission of the plurality of missions generates an outbound communication for transmission to the server for subsequent distribution as a received communication by selecting a method of communication associated with a current role of the user selected by the user from a directory of current roles of the user rendered to the user by the second computer executable instructions.

17. The system according to claim 1, wherein
the server distributes the received communications for each mission of the plurality of missions in dependence upon a third policy chain of the plurality of policy chains associated with the at least one mission of the plurality of missions; and
a user associated with a person agent of a predetermined mission of the plurality of missions generates an outbound communication for transmission to the server for subsequent distribution as a received communication by initially selecting a method of communication associated with a current role of the user selected by the user from a directory of current roles of the user rendered to the user by the second computer executable instructions; and
the system automatically determines how to deliver the received communication to each user associated with the selected current role in dependence upon those devices of the plurality of devices available to them in that selected current role as defined by the second policy chain of the plurality of policy chains for that mission of the plurality of missions at that point in time.

18. The system according to claim 1, wherein
the first portion is updated in real time to reflect the predetermined subset of the plurality of missions the user is currently associated with at that moment;
the second portion is updated in real time to reflect the current roles of the plurality of roles the user is currently associated with at that moment; and
the one or more third portions are updated in real time to reflect the current role of the plurality of roles the user is currently associated with at that moment.

19. A system for implementing, managing or running a communication or workflow management system having multiple role agents representing roles, person agents representing users and device agents representing a plurality of devices, said system comprising
a server comprising a first microprocessor and a first memory storing first data and first computer executable instructions wherein the first computer executable instructions when executed by the first microprocessor configure the server to:
combine a plurality of said role agents and their associated person agents and device agents into at least one mission of a plurality of missions;
link said role agents to said person agents with a first policy chain of a plurality of policy chains associated with the at least one mission of the plurality of missions; and
link said person agents to said device agents with a second policy chain of the plurality of policy chains associated with the at least one mission of the plurality of missions;
the plurality of devices each a second microprocessor and a second memory storing second data and second computer executable instructions wherein the second computer executable instructions when executed by the second microprocessor configure a device of the plurality of devices to:
render to a user associated with the device of the plurality of devices a graphical user interface (GUI) comprising:

render to a user associated with the device of the plurality of devices one or more portions of one or more graphical user interfaces (GUIs) comprising:
a first portion rendering a predetermined subset of the plurality of missions to the user which are established in dependence upon the person agent automatically associated with the user;
a second portion rendering a first context sensitive work area comprising a plurality of navigation elements automatically established in dependence upon a mission of the predetermined subset of the plurality of missions selected by the user in the first portion and a current user role, the user role being a role of the plurality of roles associated with the user for the selected mission of the predetermined subset of the plurality of mission; and
one or more third portions each comprising a second context sensitive work area rendering content in dependence upon a navigation element of the plurality of navigation elements selected by the user within the second portion wherein the rendered content is role dependent data automatically established in dependence upon the current user role of the user, the selected mission of the predetermined subset of the plurality of missions and the selection made by the user with respect to the navigation element of the plurality of navigation elements rendered within the first context sensitive work area; wherein
the first data comprises
a first subset relating to the roles, users, and plurality of devices;
a second subset relating to the plurality of missions; and
a third subset relating to plurality of policy chains;
each mission of the plurality of missions comprises the said role agents and their associated person agents and device agents, a plurality of work items instantiated with connections to the said role agents filled with data, and adapted to receive communications;
the first computer executable instructions further configure the server to distribute received communications for each mission of the plurality of missions; and
the first portion, the second portion, and the one or more third portions are established in dependence upon a device of the plurality of devices associated with the user via the device agent associated with the user and the selected mission of the predetermined subset of the plurality of missions via the second policy chain of the plurality of policy chains.

20. The system according to claim 19, wherein
the current user role is selected by the user selecting a graphical user interface (GUI) interface element of a plurality of GUI interface elements currently rendered to the user; and
the plurality of GUI interface elements comprises:
a first subset which are permanent;
a second subset which are only rendered in dependence upon the user logging into a role of the plurality of roles;
a third subset which are only rendered when activated by a policy chain of the plurality of policy chains associated with the selected mission of the predetermined subset of plurality of missions; and
a fourth subset are dynamically rendered where each GUI interface element of the fourth subset of the plurality of GUI interface elements is associated with a role of the user and the fourth subset of the plurality of GUI interface elements are automatically and dynamically defined in dependence upon a current set of role agents associated with one or more person agents associated with the user by the one or more first policy chains of the plurality of policy chains associated with a subset of the plurality of missions with which the user is associated by their one or more person agents.

21. The system according to claim 19, wherein
at least one of the first portion, the second portion and the third portion are dynamically and automatically adjusted in dependence upon a change of role of the user; and
the change of role is defined by a set of role agents associated with one or more person agents associated with the user by the one or more first policy chains of the plurality of policy chains associated with a subset of the plurality of missions with which the user is associated by their one or more person agents.

* * * * *